US012627676B2

(12) United States Patent
Afroz et al.

(10) Patent No.: US 12,627,676 B2
(45) Date of Patent: May 12, 2026

(54) SYSTEM AND METHOD FOR EVALUATING ONLINE DATA

(71) Applicant: Avast Software s.r.o., Prague (CZ)

(72) Inventors: Sadia Afroz, Berkeley, CA (US); Vibhor Sehgal, San Francisco, CA (US)

(73) Assignee: Gen Digital Inc., Tempe, AZ (US)

( * ) Notice: Subject to any disclaimer, the term of this patent is extended or adjusted under 35 U.S.C. 154(b) by 530 days.

(21) Appl. No.: 18/159,821

(22) Filed: Jan. 26, 2023

(65) Prior Publication Data

US 2024/0259393 A1    Aug. 1, 2024

(51) Int. Cl.
*H04L 9/40*      (2022.01)
*G06F 18/241*    (2023.01)
*G06Q 30/0282*   (2023.01)

(52) U.S. Cl.
CPC .......... *H04L 63/123* (2013.01); *G06F 18/241* (2023.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 2019/0082224 A1* | 3/2019 | Bradley | ............. | G06Q 30/0282 |
| 2019/0163327 A1* | 5/2019 | Otero | ...................... | G06F 16/26 |
| 2019/0179861 A1* | 6/2019 | Goldenstein | ........ | G06F 16/9535 |
| 2022/0342943 A1* | 10/2022 | Pavlov | .................... | G06N 5/02 |
| 2022/0358293 A1* | 11/2022 | Renard | ................. | G06F 16/353 |

OTHER PUBLICATIONS

Suresh, Aswin, Chi-Hsuan Wu, and Matthias Grossglauser. "It's All Relative: Interpretable Models for Scoring Bias in Documents." arXiv preprint arXiv:2307.08139 (2023). (Year: 2023).*

* cited by examiner

*Primary Examiner* — Laura Yesildag
(74) *Attorney, Agent, or Firm* — Dovas Law, P.C.

(57)           ABSTRACT

A method and system detects at a plurality of network locations a plurality of accuracy ratings of a plurality of media instances and detects the plurality of media instances. A particular accuracy rating of one or more particular media instances is detected at a particular network location, and the one or more particular media instances are detected. A bias of the particular accuracy rating is determined based on the particular accuracy rating, the one or more particular media instances, the plurality of accuracy ratings, and the plurality of media instances. An indication is transmitted to a user based on the bias of the particular accuracy rating.

15 Claims, 17 Drawing Sheets

12

82

54

80

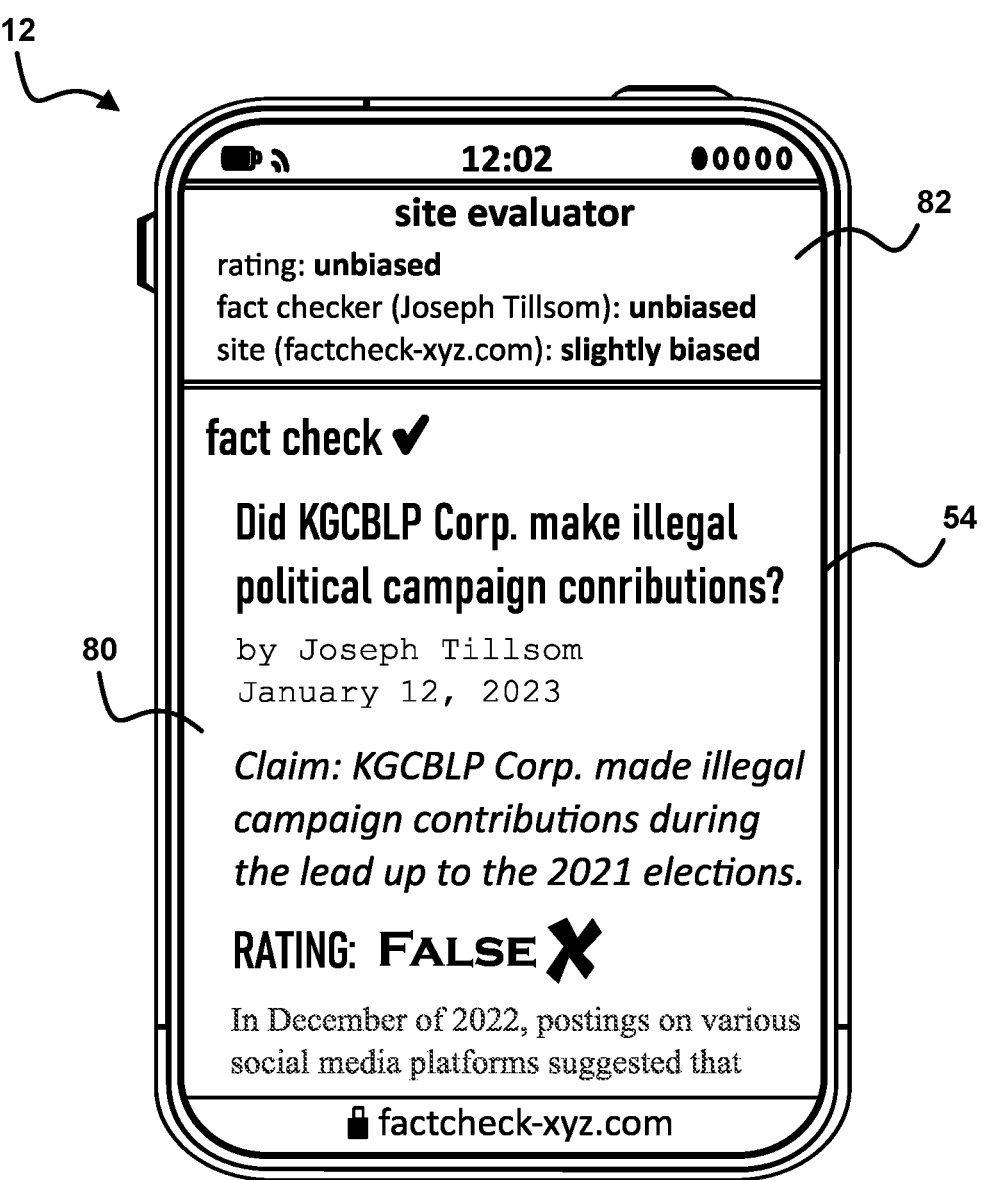

site evaluator rating: unbiased
fact checker (Joseph Tillsom): unbiased
site (factcheck-xyz.com): slightly biased fact check ✔

Did KGCBLP Corp. make illegal political campaign conributions?

by Joseph Tillsom
January 12, 2023

*Claim: KGCBLP Corp. made illegal campaign contributions during the lead up to the 2021 elections.*

RATING: FALSE ✗

In December of 2022, postings on various social media platforms suggested that

🔒 factcheck-xyz.com

FIG. 6

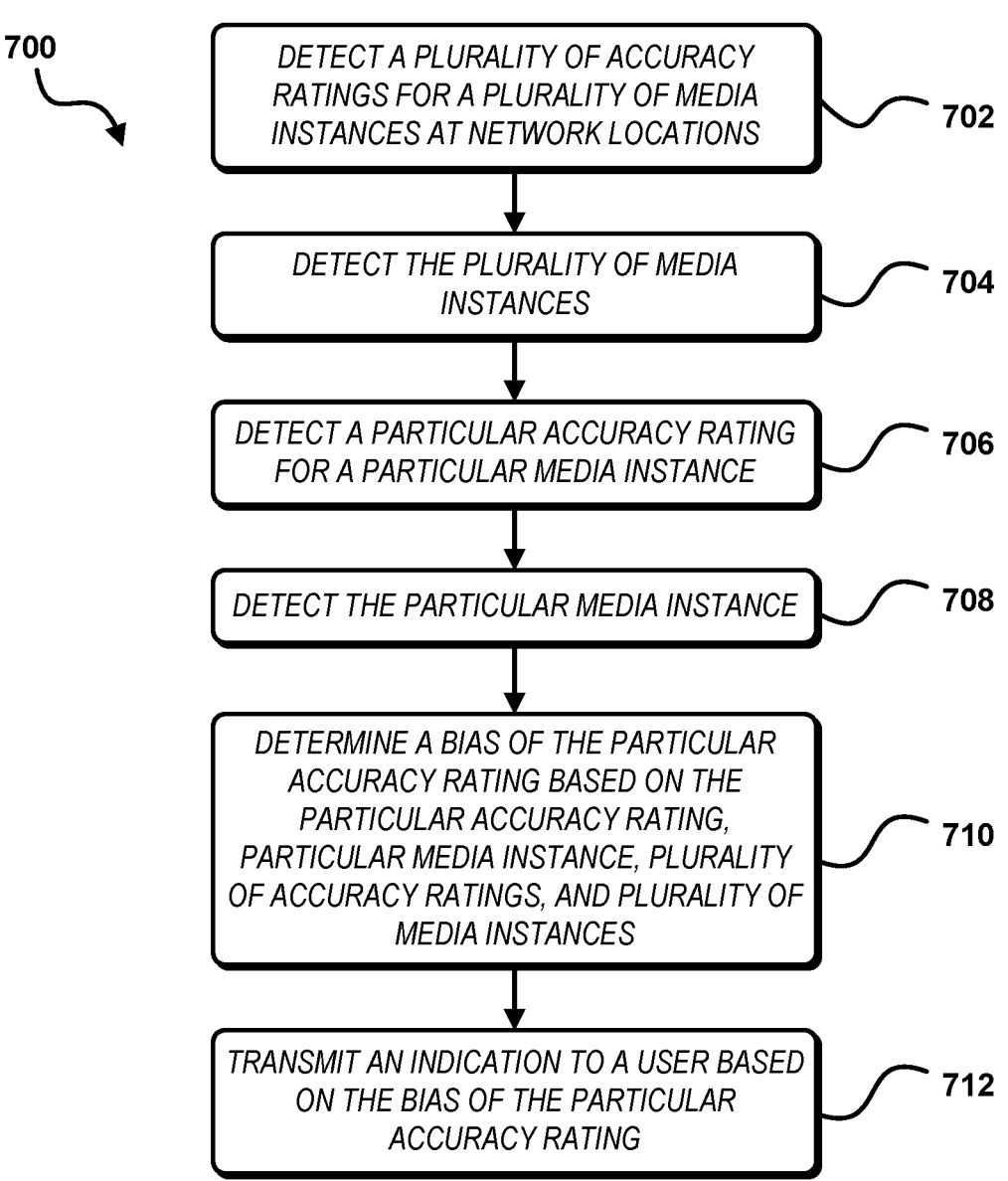

700

DETECT A PLURALITY OF ACCURACY RATINGS FOR A PLURALITY OF MEDIA INSTANCES AT NETWORK LOCATIONS — 702

DETECT THE PLURALITY OF MEDIA INSTANCES — 704

DETECT A PARTICULAR ACCURACY RATING FOR A PARTICULAR MEDIA INSTANCE — 706

DETECT THE PARTICULAR MEDIA INSTANCE — 708

DETERMINE A BIAS OF THE PARTICULAR ACCURACY RATING BASED ON THE PARTICULAR ACCURACY RATING, PARTICULAR MEDIA INSTANCE, PLURALITY OF ACCURACY RATINGS, AND PLURALITY OF MEDIA INSTANCES — 710

TRANSMIT AN INDICATION TO A USER BASED ON THE BIAS OF THE PARTICULAR ACCURACY RATING — 712

FIG. 8

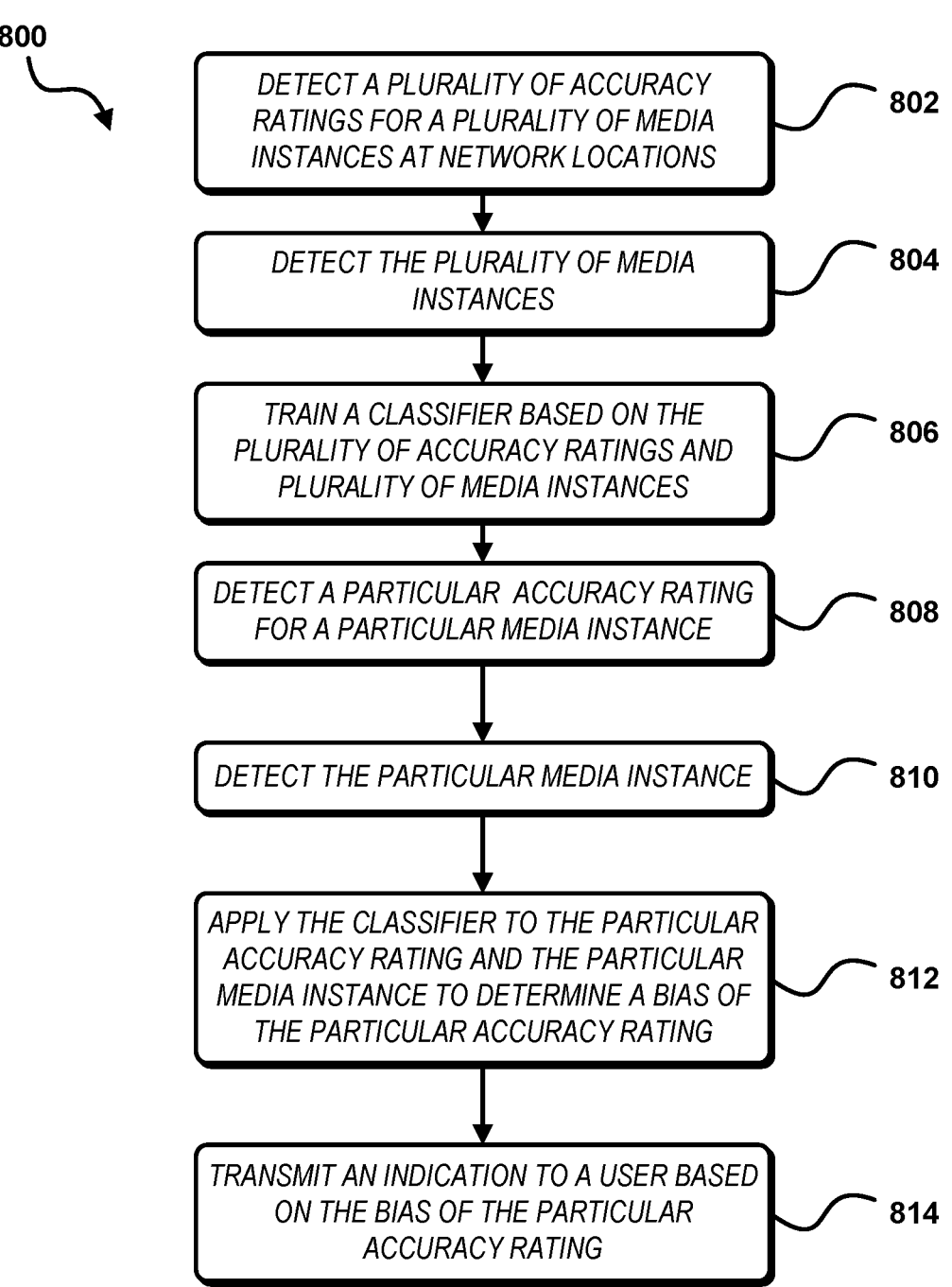

800

DETECT A PLURALITY OF ACCURACY RATINGS FOR A PLURALITY OF MEDIA INSTANCES AT NETWORK LOCATIONS — 802

DETECT THE PLURALITY OF MEDIA INSTANCES — 804

TRAIN A CLASSIFIER BASED ON THE PLURALITY OF ACCURACY RATINGS AND PLURALITY OF MEDIA INSTANCES — 806

DETECT A PARTICULAR ACCURACY RATING FOR A PARTICULAR MEDIA INSTANCE — 808

DETECT THE PARTICULAR MEDIA INSTANCE — 810

APPLY THE CLASSIFIER TO THE PARTICULAR ACCURACY RATING AND THE PARTICULAR MEDIA INSTANCE TO DETERMINE A BIAS OF THE PARTICULAR ACCURACY RATING — 812

TRANSMIT AN INDICATION TO A USER BASED ON THE BIAS OF THE PARTICULAR ACCURACY RATING — 814

PROCESSOR 2002

INSTRUCTIONS 2024

MAIN MEMORY 2004

INSTRUCTIONS 2024

STATIC MEMORY 2006

VISUAL DISPLAY 2010

NETWORK INTERFACE 2020

BUS 2008

CHARACTER INPUT APPARATUS 2012

AUDIO INPUT APPARATUS 2013

POINTING/SELECTING APPARATUS 2014

DATA DRIVE 2016

COMPUTER-READABLE MEDIUM 2022

INSTRUCTIONS 2024

LOCATION DETERMINING SYSTEM 2017

SIGNAL GENERATOR 2018

SYSTEM AND METHOD FOR EVALUATING ONLINE DATA

TECHNICAL FIELD

The disclosure relates generally to evaluating data rendered accessible via a network.

BACKGROUND

Determining the authenticity of a piece of information online can be challenging. Several online fact checking entities exist that analyze and label the veracity of online information. Different fact checking entities use different criteria for labeling online information. Fact checking entities may have biases, for example they may be influenced based on their financial interests and may label their competitors as biased. Since there is no easy way for online users to verify identities and biases of fact checking entities, bad actors posing as fact checkers can spread misinformation online.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided including detecting at a plurality of network locations a plurality of accuracy ratings of a plurality of media instances and detecting the plurality of media instances. A particular accuracy rating of one or more particular media instances is detected at a particular network location, and the one or more particular media instances are detected. A bias of the particular accuracy rating is determined based on the particular accuracy rating, the one or more particular media instances, the plurality of accuracy ratings, and the plurality of media instances. An indication is transmitted to a user via a computing device based on the bias of the particular accuracy rating.

A further method is provided including detecting at a plurality of network locations a plurality of accuracy ratings of a plurality of media instances and detecting the plurality of media instances. A classifier is trained based on the plurality of accuracy ratings and the plurality of media instances. A particular accuracy rating of one or more particular media instances is detected at a particular network location. The one or more particular media instances are detected. The classifier is applied to the particular accuracy rating and the one or more particular media instances to determine a bias of the particular accuracy rating. An indication is transmitted to a user via a computing device based on the bias of the particular accuracy rating.

A computing system is provided including one or more processors and one or more non-transitory computer readable storage media having encoded thereon instructions that when executed by the one or more processors cause the computing system to perform a process. The process includes detecting at a plurality of network locations a plurality of accuracy ratings of a plurality of media instances and detecting the plurality of media instances. The process also includes detecting at a particular network location a particular accuracy rating of one or more particular media instances, detecting the one or more particular media instances, and determining a bias of the particular accuracy rating based on the particular accuracy rating, the one or more particular media instances, the plurality of accuracy ratings, and the plurality of media instances. The process further includes transmitting an indication to a user based on the bias of the particular accuracy rating.

A network-enabled evaluation system is provided including a first computing system and a second computing system. The first computing system includes at least a first processor and at least a first non-transitory computer readable storage medium having encoded thereon first instructions that when executed by the at least the first processor cause the first computing system to perform a first process. The first process includes detecting at a plurality of network locations a plurality of accuracy ratings of a plurality of media instances and detecting the plurality of media instances. The first process also includes detecting at a particular network location a particular accuracy rating of one or more particular media instances and detecting the one or more particular media instances. The first process further includes determining a bias of the particular accuracy rating based on the particular accuracy rating, the one or more particular media instances, the plurality of accuracy ratings, and the plurality of media instances. The second computing system includes at least a second processor and at least a second non-transitory computer readable storage medium having encoded thereon second instructions that when executed by the at least the second processor cause the second computing system to perform a second process. The second process includes detecting browsing at the particular network location by a user and receiving the bias of the particular accuracy rating from the first computing system. The second process further includes transmitting an indication to the user based on the bias of the particular accuracy rating responsive to detecting the browsing at the particular network location.

A non-transitory computer-readable storage medium is provided which stores executable instructions that, as a result of execution by one or more processors of a computing system, cause the computing system to perform operations. The operations include detecting at a plurality of network locations a plurality of accuracy ratings of a plurality of media instances and detecting the plurality of media instances. The operations also include detecting at a particular network location a particular accuracy rating of one or more particular media instances, detecting the one or more particular media instances, and determining a bias of the particular accuracy rating based on the particular accuracy rating, the one or more particular media instances, the plurality of accuracy ratings, and the plurality of media instances. The operations further include transmitting an indication to a user via a computing device based on the bias of the particular accuracy rating.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 6 shows an interactive display with hypothetical content according to an illustrative embodiment.

FIGS. 8 and 9 are diagrams showing methods in which a bias of an accuracy rating is determined and transmitted according to illustrative embodiments.

DETAILED DESCRIPTION OF ILLUSTRATIVE EMBODIMENTS

As described herein, reference to "first," "second," "third," "particular," "additional," or "other" components or implementations (e.g., "a first entity," "a particular media instance," or "a particular network location") is not used to show a serial or numerical limitation or a limitation of quality but instead is used to distinguish or identify the various components and implementations.

Figure 1:
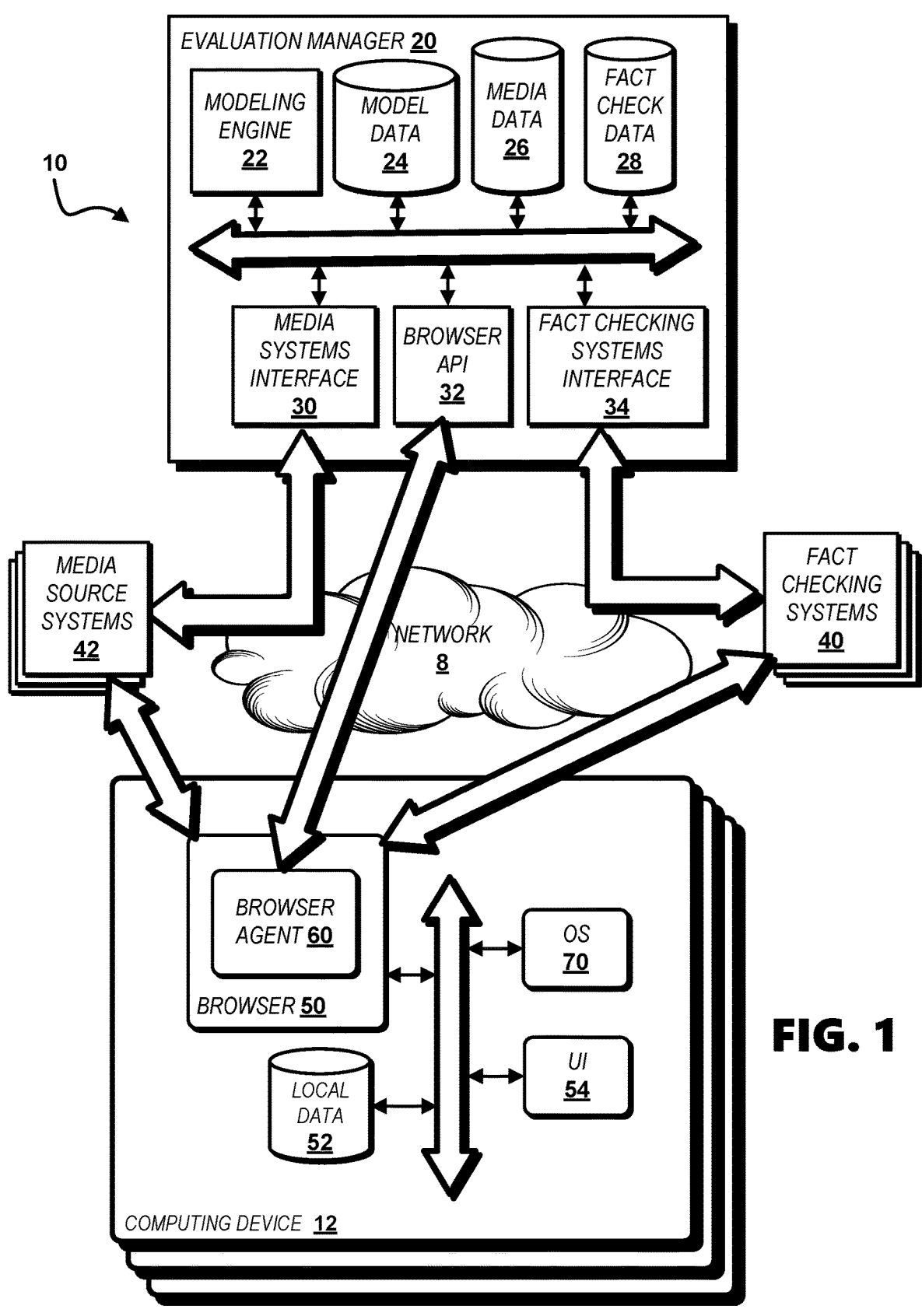
FIG. 1 shows an environment enabled by a computer network in which a network-connectable processor-enabled evaluation manager provides assessments of online media instances to computing devices.

Referring to FIG. 1, an environment 10 enabled by a computer network 8 is illustrated in which a network-connectable processor-enabled evaluation manager 20 scans networks for the purpose of identifying network-accessible misinformation accessible by computing devices 12. Such misinformation may for example create risks or threats to computing devices 12 operating in the computer network 8. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A browser agent 60, for example a browser extension, plugin, addon, or integration, enables monitoring of network browsing activities performed by a user using a web browser application ("browser") 50 on a computing device 12. The browser agent 60 further enables aggregating the browsing history and clickstream of a user on a computing device 12 and storing of aggregated information in a local datastore 52. Monitoring by the browser 50 via the browser agent 60 provides the evaluation manager 20 with intelligence data including data files and ordered sequences of hyperlinks followed by a user at one or more websites (e.g., snopes-.com™, FactCheck.org™, flackcheck.org™), or other network destinations, which data is beneficially received by the evaluation manager 20 and stored in de-identified form in a media datastore 26.

The evaluation manager 20 maintains one or more databases, including the media datastore 26 and fact check datastore 28, of current media instances. As described herein, media instances include articles, videos, audio recordings, posts, or text of any length suitable to convey meaning. The media instances potentially include misinformation. The evaluation manager 20 further maintains in the one or more databases information regarding the sources of the media instances and labels including analysis including ratings of the media instances from several fact checking systems 40. A user of a computing device 12 can post a uniform resource locator ("URL") via the browser agent 60 and a browser application program interface ("API") 32 to search through a dataset in a fact check datastore 28 for labels including ratings of media instances corresponding to the URL, which labels are generated by multiple fact checking systems 40. The evaluation manager 20 allows checking labels including ratings of media instances from multiple fact checking systems 40. The fact checking systems 40 are operated by various entities and can enable services including network-based applications, webpages, or other online services which can be accessed via the browser 50 or other application.

The evaluation manager 20 labels URLs corresponding to fact checking systems 40 based on their ratings of media instances, for example responsive to requests from users for such labels via the browser API 32. The evaluation manager 20 enables users to find detailed information about the source of misinformation such as who owns a domain providing misinformation hosted by a media source system 42, who shared the domain on a social media site (e.g., Twitter, Facebook, Instagram) hosted by another media source system 42, which other domains the domain providing misinformation is connected with, and how the domain providing misinformation evolves over time. Media source systems 42 are operated by various entities and can enable services including network-based applications, webpages, or other online services which can be accessed via the browser 50 or other application.

The evaluation manager 20 gathers intelligence data in the form of data files, content, and screen captures from fact checking systems 40 via a fact checking systems interface 34, which data is stored in the fact check datastore 28. The evaluation manager 20 gathers intelligence data in the form of data files, content, and screen captures from media source systems 42 via a media systems interface 30, which data is stored in the media datastore 26.

The evaluation manager 20 coupled to a computing device 12 enables evaluations regarding biases of ratings of media instances to be provided to the computing device 12 via the browser agent 60 in real-time during user network browsing activities. The browser agent 60 monitors via the browser 50 user activity on network-based applications and websites enabled by fact checking systems 40 and media source systems 42. Monitored data is stored in the local datastore 52, fed to the evaluation manager 20 via the browser API 32, and stored in one or both of the media datastore 26 or the fact check datastore 28, beneficially in de-identified form, which data is used in generating evaluations regarding biases of ratings of media instances. The browser API 32 communicates with the browser agent 60 via the computer network 8. Alternatively, the evaluation manager 20 can be provided as an application on the computing device 12, for example as an integration or extension to the browser 50, and the browser agent 60 can communicate locally with the evaluation manager 20 via the browser API 32 on the computing device 12.

The browser agent 60 can be provided integral with or as an extension or plugin to one or more browsers 50 and provides notices to a user via a user interface 54 of the computing device 12. The browser agent 60 gathers user actions including browsing history and clickstreams from a browser 50 with which it is integrated or in communication with, which data is transmitted to the evaluation manager 20 via the browser API 32 and stored in one or both of the media datastore 26 or the fact check datastore 28. The evaluation manager 20 provides bias evaluations to the browser agent 60 via the browser API 32 for enabling the browser agent 60 to provide notifications to a user based on data accessed by a browser 50. An operating system 70 (hereinafter "OS 70") is executed on the computing device 12 which enables integration of the browser agent 60 and the browser 50. The browser agent 60 is beneficially provided on a plurality of computing devices 12 of a plurality of users allowing aggregation by the evaluation manager 20 of de-identified data from the plurality of computing devices 12.

The evaluation manager 20 aggregates media instances potentially including misinformation and including labels including ratings from several fact checking systems 40 regarding the media instances. The evaluation manager 20 verifies the identities of the fact checking systems 40 and compares the accuracies of the fact checking systems 40. The evaluation manager 20 further consolidates different criteria for verifying misinformation.

The evaluation manager 20 is configured for collecting and labeling misinformation. The evaluation manager 20 collects labels including ratings regarding online misinformation from fact checking systems 40. The fact checking systems 40 enable websites or other network accessible repositories for delivering fact checking information to computing devices 12 via a browser 50 or via other applications enabling content delivery to a user via a user interface 54.

The evaluation manager 20 aggregates online information including media instances from media source systems 42 and fact checking data regarding online information from fact checking systems 40. Online information includes media instances from media source systems 42, for example including misinformation. The evaluation manager 20 stores online information including media instances collected from media source systems 42 in the media datastore 26 and fact checking data from fact checking systems 40 in the fact check datastore 28.

Individual fact checking systems 40 can rate different types of information using their own criteria and are unlikely to indicate the ratings and labels from other sources. The evaluation manager 20 provides transparency to fact checking processes by aggregating labels including ratings and labeling criteria from multiple network-accessible sources. The evaluation manager 20 determines the accuracies of fact checking systems 40, determines the accuracies of fact checkers operating within fact checking systems 40, and determines the accuracies of fact checking systems 40 and fact checkers over time. As described herein, the term "bias" is synonymous and equivalent to the term "accuracy". For example, the phrase "bias of a fact checker" is synonymous and equivalent to the phrase "accuracy of a fact checker".

Figure 2:
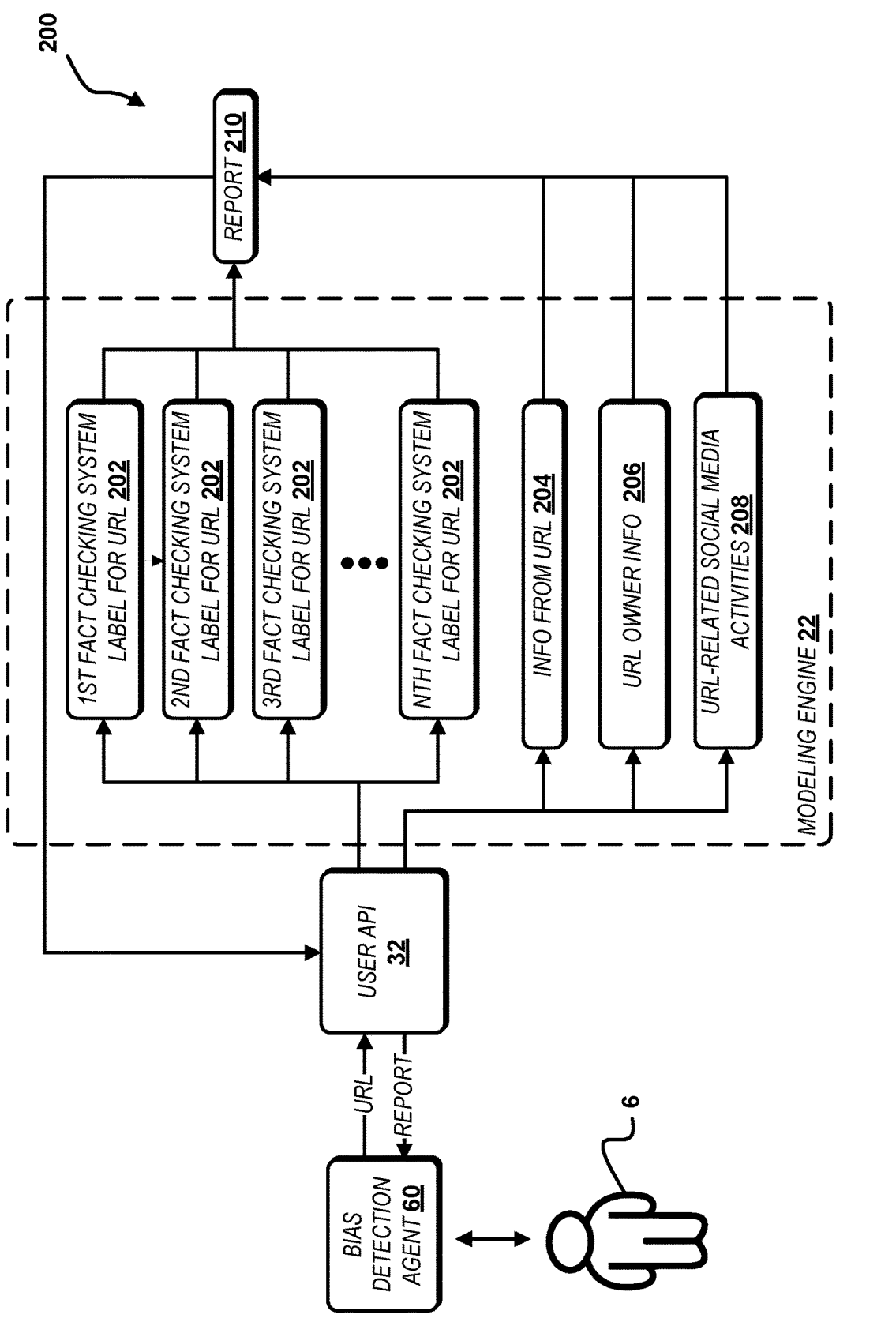
FIG. 2 is a diagram showing a process flow enabled by the evaluation manager shown in FIG. 1.

Referring to FIG. 2, a diagram shows a process flow 200 enabled by the evaluation manager 20. The browser agent 60 autonomously or via instruction from a user 6 transmits a URL to the evaluation manager 20 via the browser API 32. The URL is directed to a network-accessible media instance, for example an online article, video file, audio file, photo, or post, on a media source system 42. The modeling engine 22 generates a report 210 based on data aggregated from fact checking systems 40, media source systems 42, and other network accessible repositories of data corresponding to the media instance. In particular, the modeling engine 22 generates a report 210 based on fact checking system labels 202 from a plurality of fact checking systems 40 The fact checking system labels 202 include ratings of the media instance which the URL is directed to. The report 210 is further based on site information 204 from the URL, for example text or encoding of the media instance or text or encoding associated to the media instance. The report 210 is further based on ownership information 206 associated to the URL, extracted for example from a WHOIS database. The report 210 is further based on social media activities 208 related to the URL, for example posts or shares of the URL on social media sites hosted by media source systems 42. The modeling engine 22 generates and includes an indication of bias (i.e., accuracy) of the fact checking system labels 202 in the report 210. Additionally, or alternatively, the modeling engine 22 generates and includes indications of bias (i.e., accuracy) of the fact checking systems 40 from which the fact checking system labels 202 were aggregated.

The evaluation manager 20 aggregates information from a plurality of fact checking systems 40 hosting websites and applications (e.g., snopes.com™, FactCheck.org™, flackcheck.org™) to provide in a report 210 to users a comprehensive view of what analyses are performed by the plurality of fact checking systems 40 regarding media instances. By aggregating and processing ratings from different fact checking systems 40, the evaluation manager 20 allows comparing the fact checking systems 40 to reveal biases and how the fact checking systems 40 differ in their assessments of media instances. Particularly, the evaluation manager 20 enables the discovery of malicious fact checking systems 40 that rate substantially differently from other fact checking systems 40.

Individual fact checking systems 40 may provide a platform that enables human or non-human fact checkers to disseminate ratings regarding media instances. Fact checkers may use their own criteria which may be vague and unspecified. The evaluation manager 20 uses artificial intelligence-based processes to reveal underlying biases of fact checkers and biases of the fact checking systems 40 disseminating the ratings of the fact checkers. The evaluation manager 20 uses a classifier in the form of a machine learning model maintained and applied by the modeling engine 22 to classify a bias (i.e., accuracy) of a rating of a media instance, a bias of a fact checker that generates the rating of the media instance, and a bias of the fact checking system 40 hosting online the rating of the media instance. The machine learning model can be supervised or unsupervised and can be trained on a labeled or unlabeled curated dataset. The machine learning model is stored in a model datastore 24.

Figures 3A, 3B:
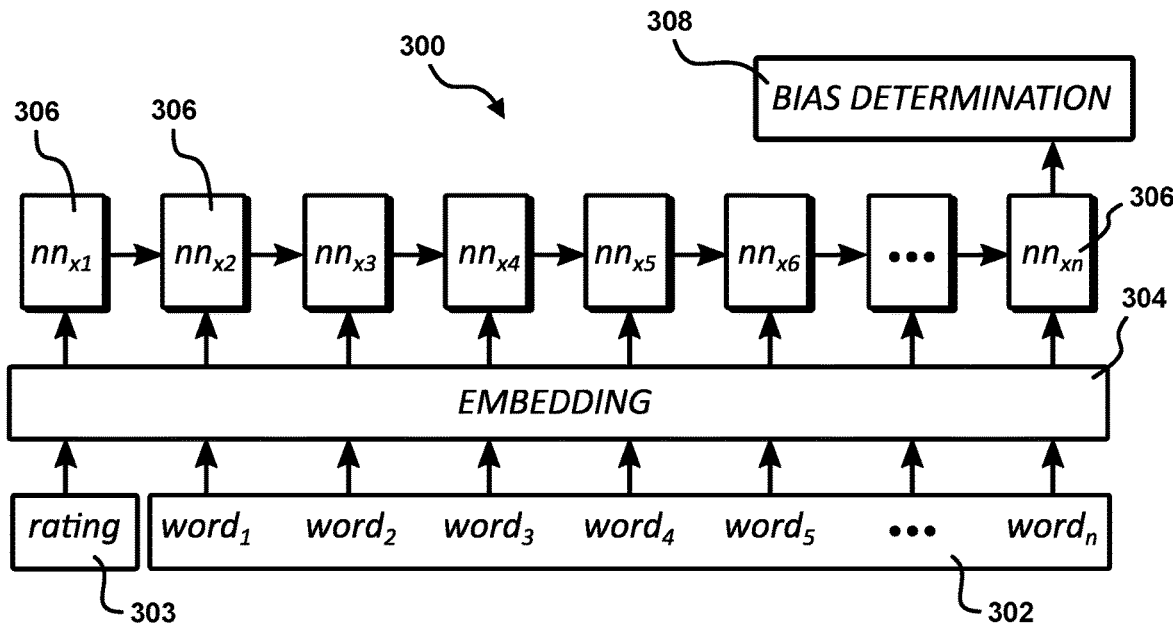
FIG. 3A is a diagram figuratively showing a classifier in the form of an artificial neural network for determining a bias in a rating of a media instance.
FIGS. 3B and 3C are diagrams figuratively showing example implementations of the classifier of FIG. 3A.

Referring to FIG. 3A, an exemplary classifier in the form of a first recurrent neural network ("RNN") 300 is shown useful for determining a bias in a rating of a media instance. Alternatively, other classifier types can be implemented such as Naïve Bayes, logistic regression, decision tree, boosted tree, support vector machine, convolutional neural network, bidirectional encoder representations from transformers ("BERT"), nearest neighbor, dimensionality reduction algorithm, or gradient boosting algorithm classifiers. The first RNN 300 includes inputs 302, 303, an embedding layer 304, hidden nodes 306, and a bias determination output 308. A first input 302 includes ordered words (word$_1$, word$_2$ , . . . word$_n$) extracted from a data media instance (e.g., online article or post) accessed from a media source system 42 by the evaluation manager 20 via the media systems interface 30 or by the browser agent 60 via a browser 50. The ordered words of the first input 302 can include one or more phrases, one or more sentences, one or more sentence fragments, or one or more paragraphs. If the media instance includes audio or video data, the first input 302 can include a transcription or encoding of the audio or video data performed by the modeling engine 22. A second input 303 includes a rating indication in the form of one or more ordered words (e.g., "true," "false," "partially true," "partially false") or a transcription or encoding of audio or video data accessed from a fact checking system 40 by the evaluation manager 20 via the fact checking systems interface 34 or by the browser agent 60 via a browser 50. The rating indication and corresponding second input 303 can include one or more words, one or more phrases, one or more sentences, one or more sentence fragments, one or more paragraphs, or an entire article, for example describing the nature of truthfulness or falseness of the media instance.

The first recurrent neural network ("RNN") 300 can be run for example by the modeling engine 22 of the evaluation manager 20 based on media instances and rating indications received by the evaluation manager 20. The embedding layer 304 creates vector representations of the input words. The hidden nodes 306 sequentially implement neural network algorithms (nn$_{x1}$, nn$_{x2}$, . . . nn$_{xn}$) on vectorized words, providing feedback to subsequent nodes 306 to generate a bias determination output 308. The bias determination output 308 includes an assessment of bias (i.e., accuracy) of the rating indication, which assessment is numeric across a range, for example a range between 1 and 5, where 1 is unbiased, 2 is slightly biased, 3 is moderately biased, 4 is highly biased, and 5 is very highly biased. The assessment of bias can be attributed to the media instance or the fact checker (e.g., author) of the rating indication. Biases of multiple rating indications associated with a particular fact checker can be averaged to determine a bias of the particular fact checker.

Figure 3C:
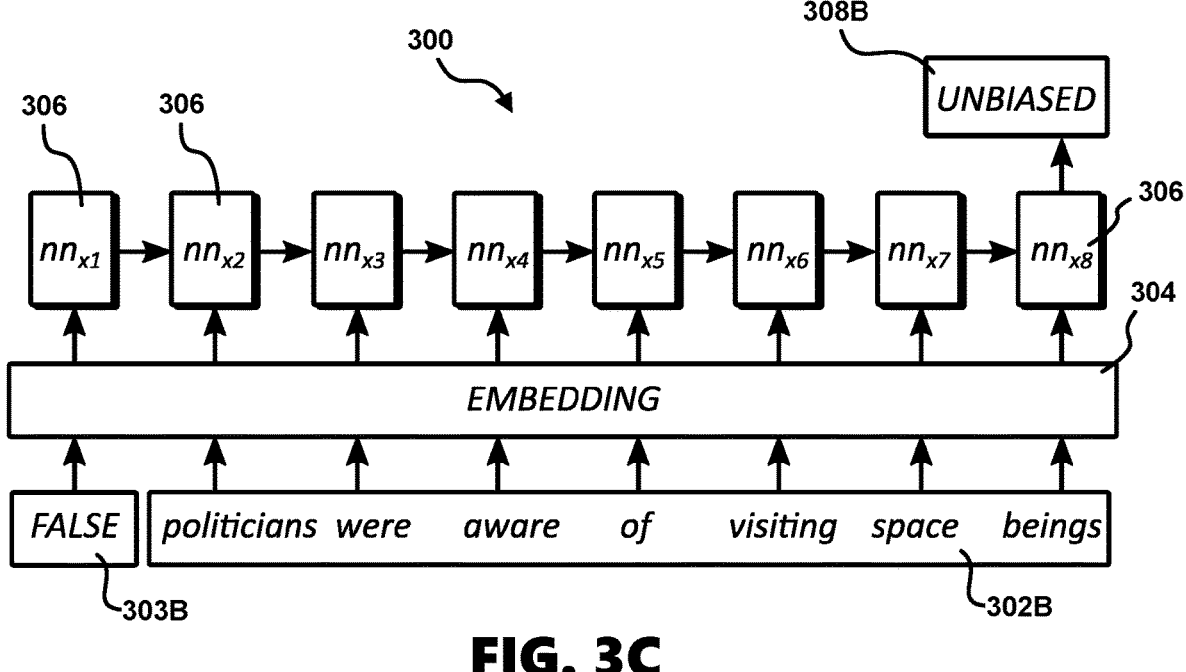

Referring to FIG. 3B, a hypothetical exemplary implementation of the first RNN 300 is shown in which a hypothetical sentence fragment "politicians were aware of visiting space beings" extracted from a hypothetical data media instance is input as a first input 302A, the word "true" extracted from a hypothetical rating indication is input as a second input 303A, and a hypothetical bias determination output 308A is determined as "highly biased" by the first RNN 300. Referring to FIG. 3C, another hypothetical exemplary implementation of the first RNN 300 is shown in which a hypothetical sentence fragment "politicians were aware of visiting space beings" extracted from a hypothetical data media instance is input as a first input 302B, the word "false" extracted from a hypothetical rating indication is input as a second input 303B, and a hypothetical bias determination output 308B is determined as "unbiased" by the first RNN 300.

The first RNN 300 can be trained for example by automatically labeling rating indications from certain fact checking systems 40 as corresponding to a specified bias determination output 308 regardless of the corresponding media instances, for example automatically labeling rating indications from fact checking systems 40 or fact checkers known with high confidence to be trustworthy or untrustworthy. The first RNN 300 can further be trained automatically for example based on the assumption that all media instances from particular media source systems 42 are accurate or all media instances from particular media source systems 42 are inaccurate. For example, a "true" rating indication for a media instance originating from a known purveyor of falsehoods (e.g., an authoritarian governmental entity) can be associated with a "highly biased" bias determination output 308 during a training process.

Figures 4A, 4B:
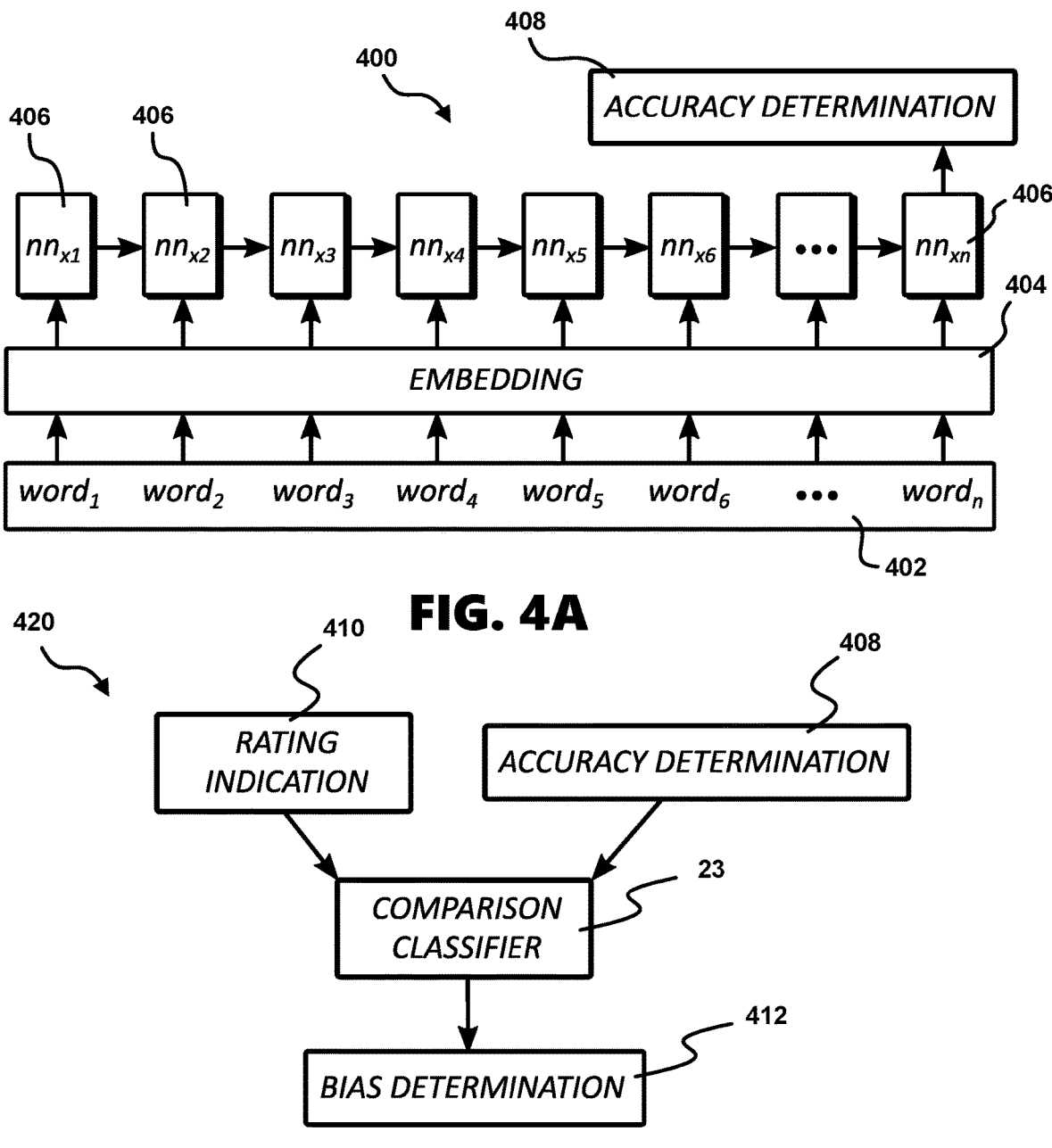
FIG. 4A is a diagram figuratively showing a classifier in the form of an artificial neural network for determining accuracy of an online media instance.
FIG. 4B is a diagram showing a process flow for making a bias determination.

Referring to FIG. 4A, an alternative exemplary classifier in the form of a second recurrent neural network ("RNN") 400 is shown useful for determining a bias in a rating of a media instance. Alternatively, other classifier types can be implemented such as Naïve Bayes, logistic regression, decision tree, boosted tree, support vector machine, convolutional neural network, bidirectional encoder representations from transformers ("BERT"), nearest neighbor, dimensionality reduction algorithm, or gradient boosting algorithm classifiers. The second RNN 400 includes an input 402, an embedding layer 404, hidden nodes 406, and an accuracy determination output 408. The input 402 includes ordered words (word$_1$, word$_2$ , . . . word$_n$) extracted from a data media instance (e.g., online article or post) accessed from a media source system 42 by the evaluation manager 20 via the media systems interface 30 or by the browser agent 60 via a browser 50. The ordered words of the input 402 can include one or more phrases, one or more sentences, one or more sentence fragments, or one or more paragraphs. If the media instance includes audio or video data, the input 402 can include a transcription or encoding of the audio or video data performed by the modeling engine 22.

The second recurrent neural network ("RNN") 400 can be run for example by the modeling engine 22 of the evaluation manager 20 based on media instances received by the evaluation manager 20. The embedding layer 404 creates vector representations of the input words. The hidden nodes 406 sequentially implement neural network algorithms (nn$_{x1}$, nn$_{x2}$, . . . nn$_{xn}$) on vectorized words, providing feedback to subsequent nodes 406 to generate an accuracy determination output 408. The accuracy determination output 408 includes an assessment of accuracy of the media instance, which assessment is numeric across a range, for example a range between 1 and 3, where 1 accurate, 2 is partially inaccurate, and 3 is inaccurate. The assessment of accuracy can be attributed to the media instance, the author of the media instance, or the media source system 42.

Referring to FIG. 4B, a process flow 420 for making a bias determination is shown. A rating indication 410 in the form of one or more words (e.g., "true," "false," "partially true," "partially false") or a transcription or encoding of audio or video data is accessed from a fact checking system 40 by the evaluation manager 20 via the fact checking systems interface 34 or by the browser agent 60 via a browser 50. The rating indication 410 is compared to the accuracy determination output 408 by a comparison classifier 23 provided integral with the modeling engine 22 to produce a bias determination 412, which bias determination 412 is numeric across a range, for example a range between 1 and 5, where 1 is unbiased, 2 is slightly biased, 3 is moderately biased, 4 is highly biased, and 5 is very highly biased. For example, a rating indication 410 in agreement with an accuracy determination output 408 produces an "unbiased" bias determination 412, and a rating indication in conflict with an accuracy determination output 408 produces a "slightly biased," "moderately biased," "highly biased," or "very highly biased" bias determination 412.

Figures 4C, 4D:
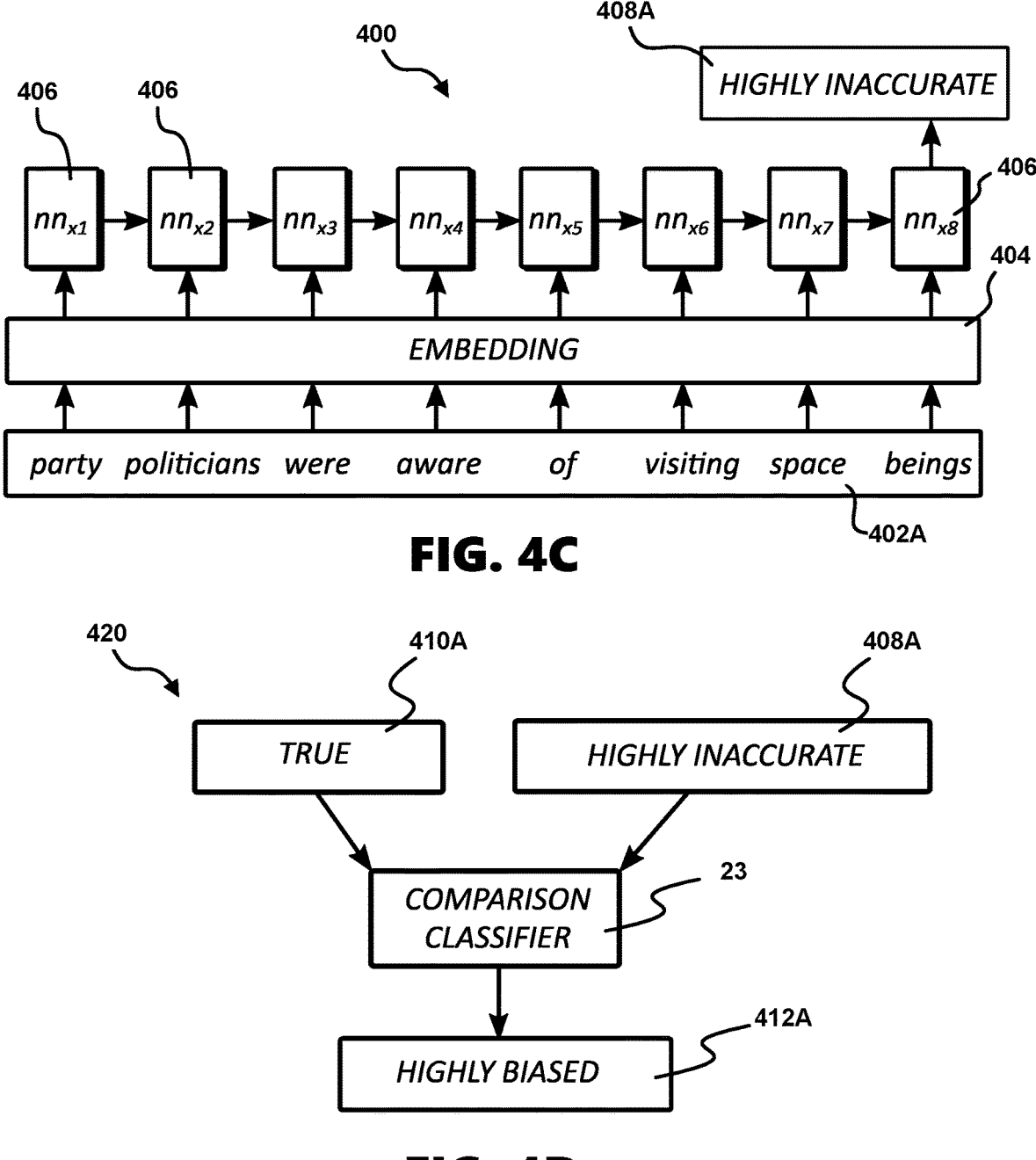
FIG. 4C is a diagram figuratively showing an example implementation of the classifier of FIG. 4A.
FIG. 4D is a diagram figuratively showing an example implementation of the process flow of FIG. 4B.

Referring to FIG. 4C, a hypothetical exemplary implementation of the second RNN 400 is shown in which a hypothetical sentence fragment "party politicians were aware of visiting space beings" extracted from a hypothetical data media instance is input as an input 402A, and a hypothetical accuracy determination output 408A is determined as "highly inaccurate" by the second RNN 400. Referring to FIG. 4D, a hypothetical rating indication 410A in the form of the word "true" is compared to the hypothetical accuracy determination output 408A in the form of the words "highly inaccurate" by the comparison classifier 23 to determine a hypothetical bias determination 412A in the form of the words "highly biased". The "highly biased" determination was made by the comparison classifier 23 because a "highly inaccurate" media instance cannot be labeled as "true".

Figures 5A, 5B:
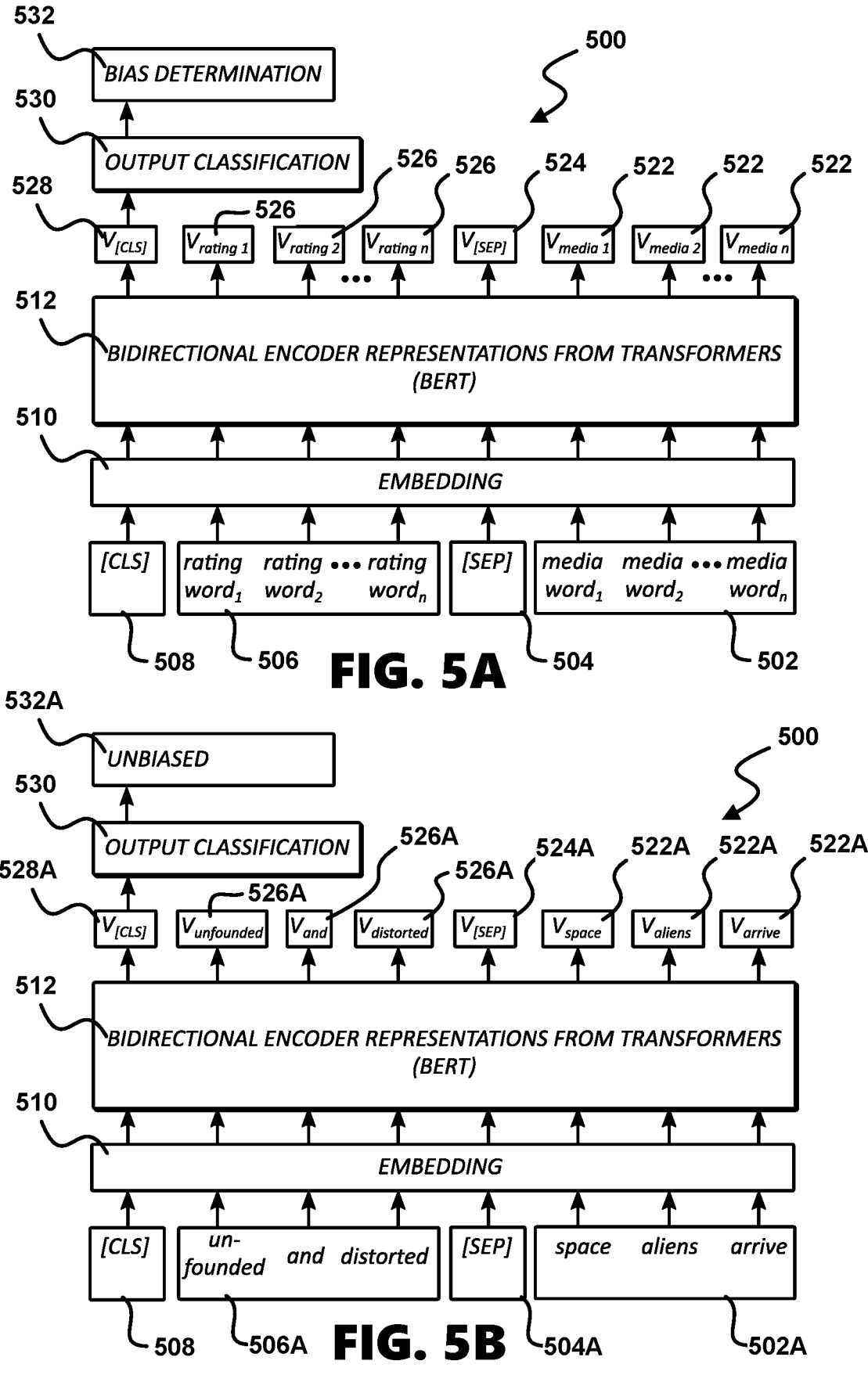
FIG. 5A is a diagram figuratively showing a classifier for determining a bias in a rating of a media instance.
FIG. 5B is a diagram figuratively showing an example implementation of the classifier of FIG. 5A.
Figure 7A:
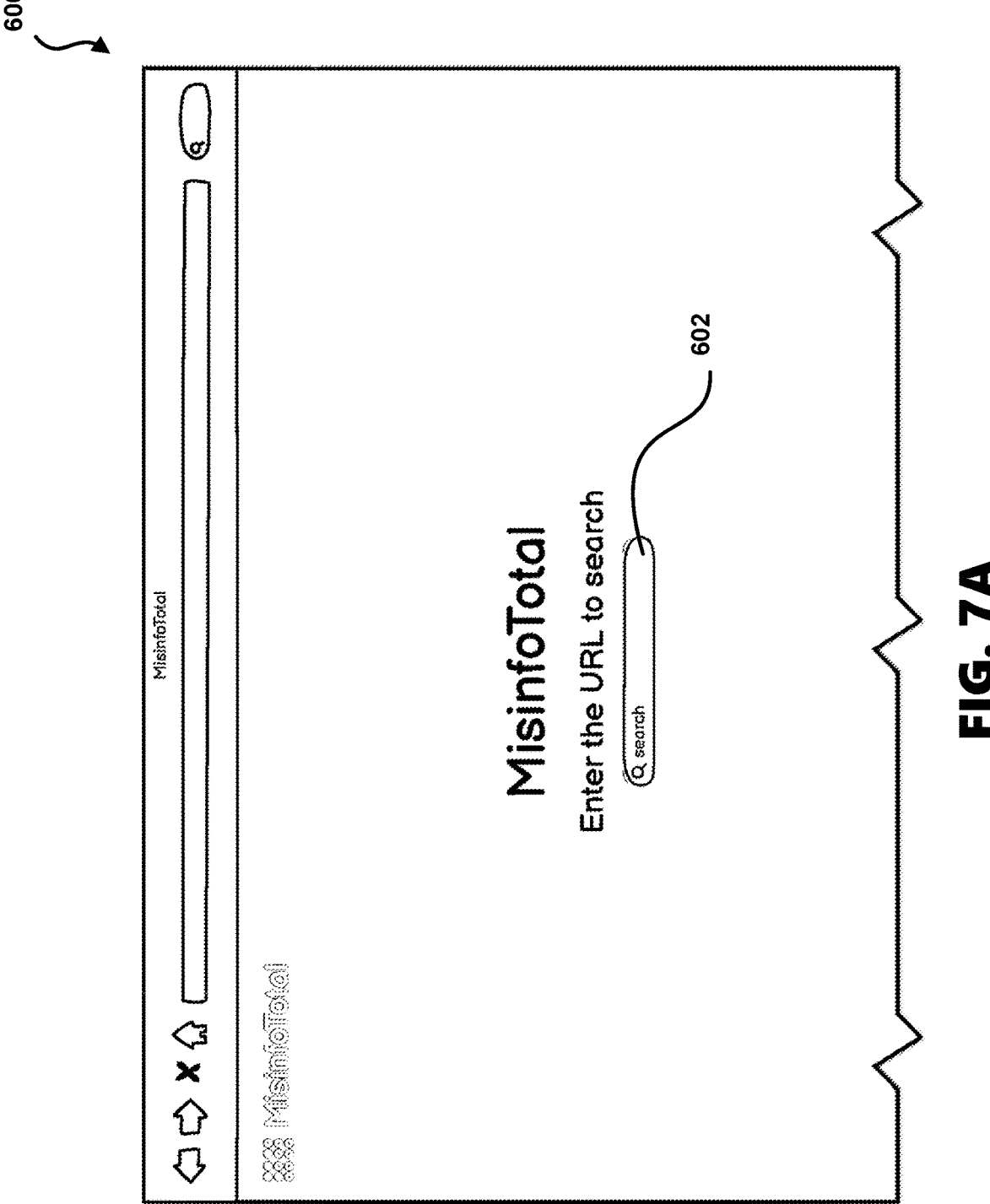
FIGS. 7A-7F shows additional interactive displays with hypothetical content according to an illustrative embodiment.
Figure 7B:
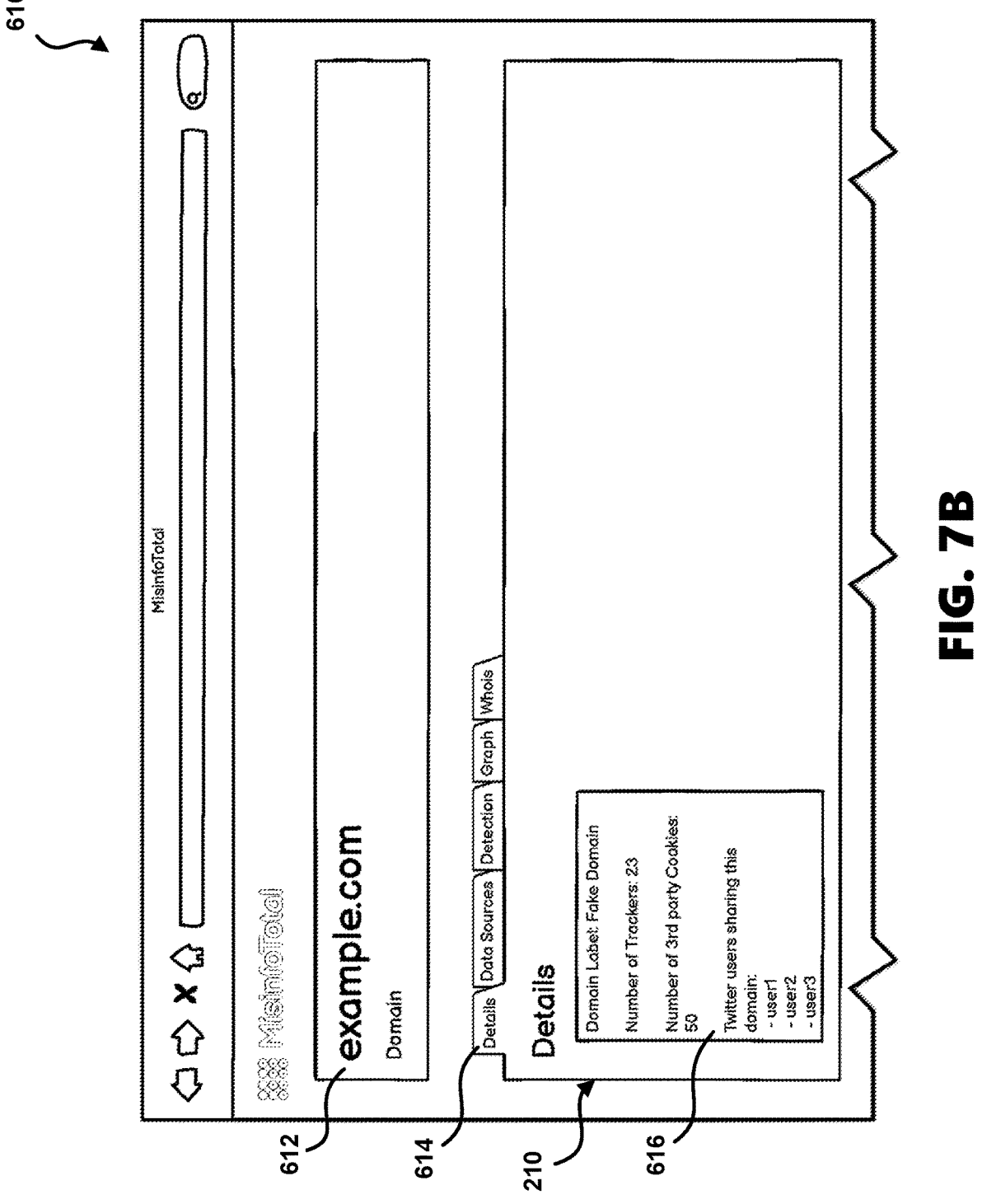
Figure 7C:
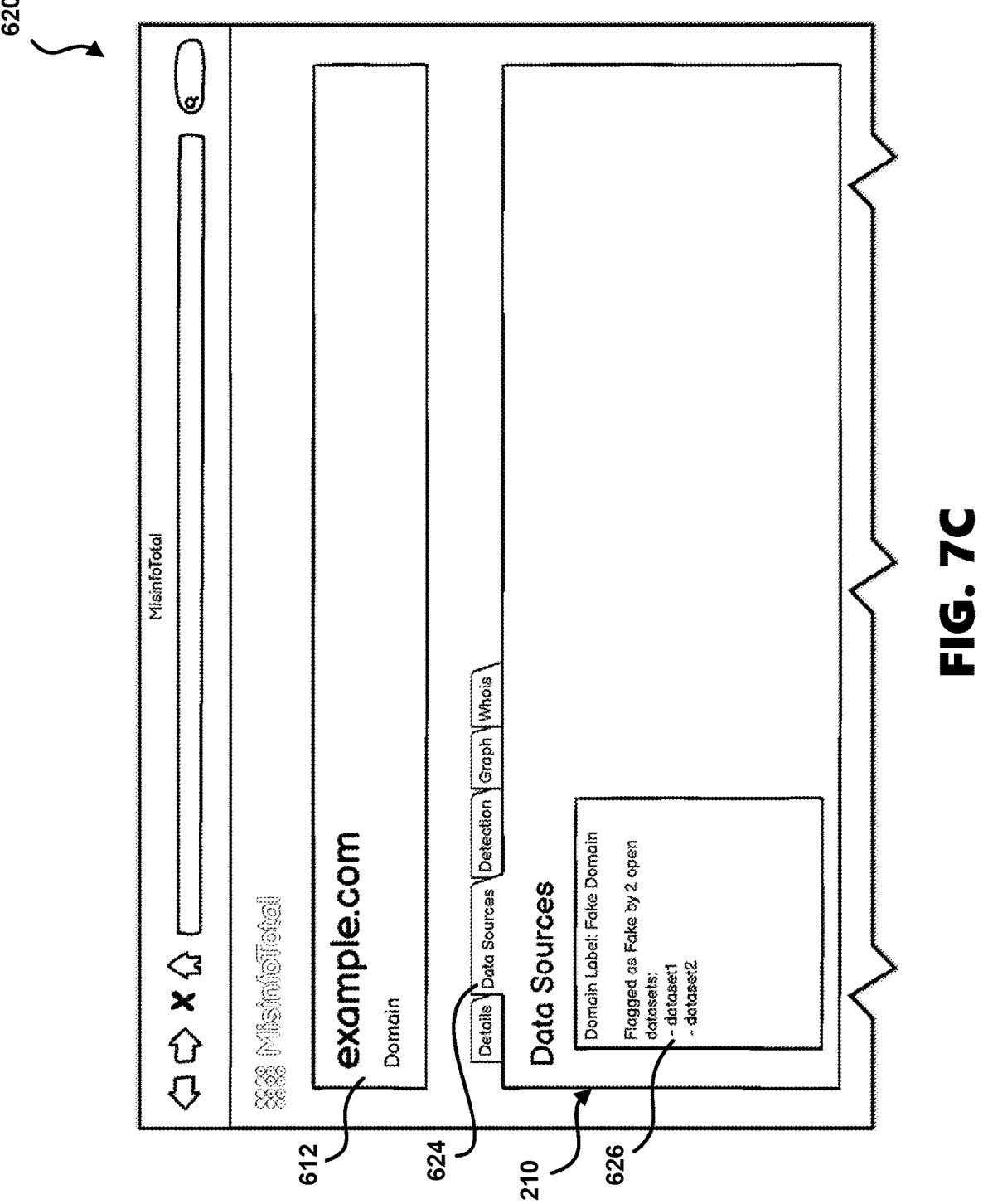
Figure 7D:
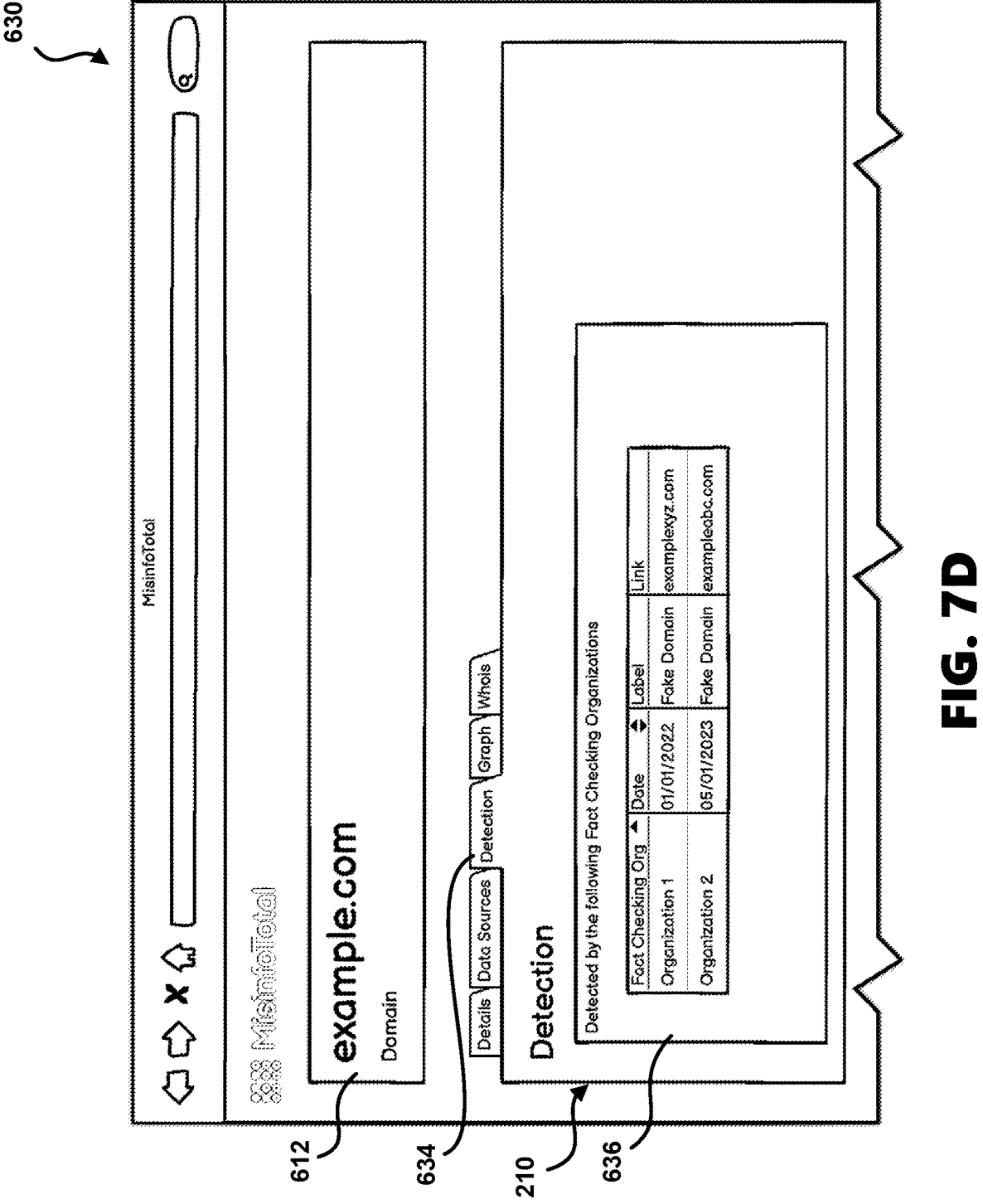
Figure 7E:
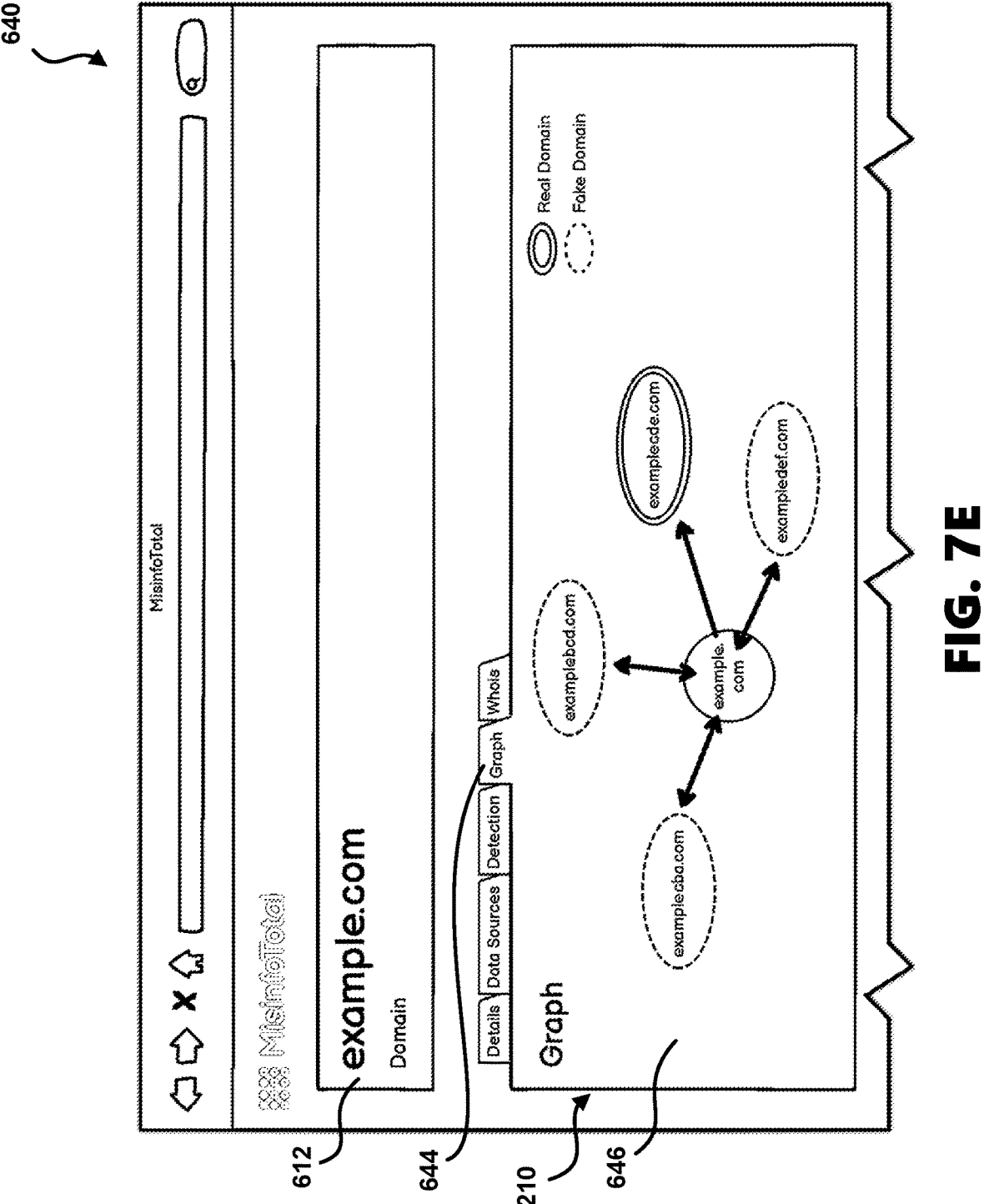
Figure 7F:
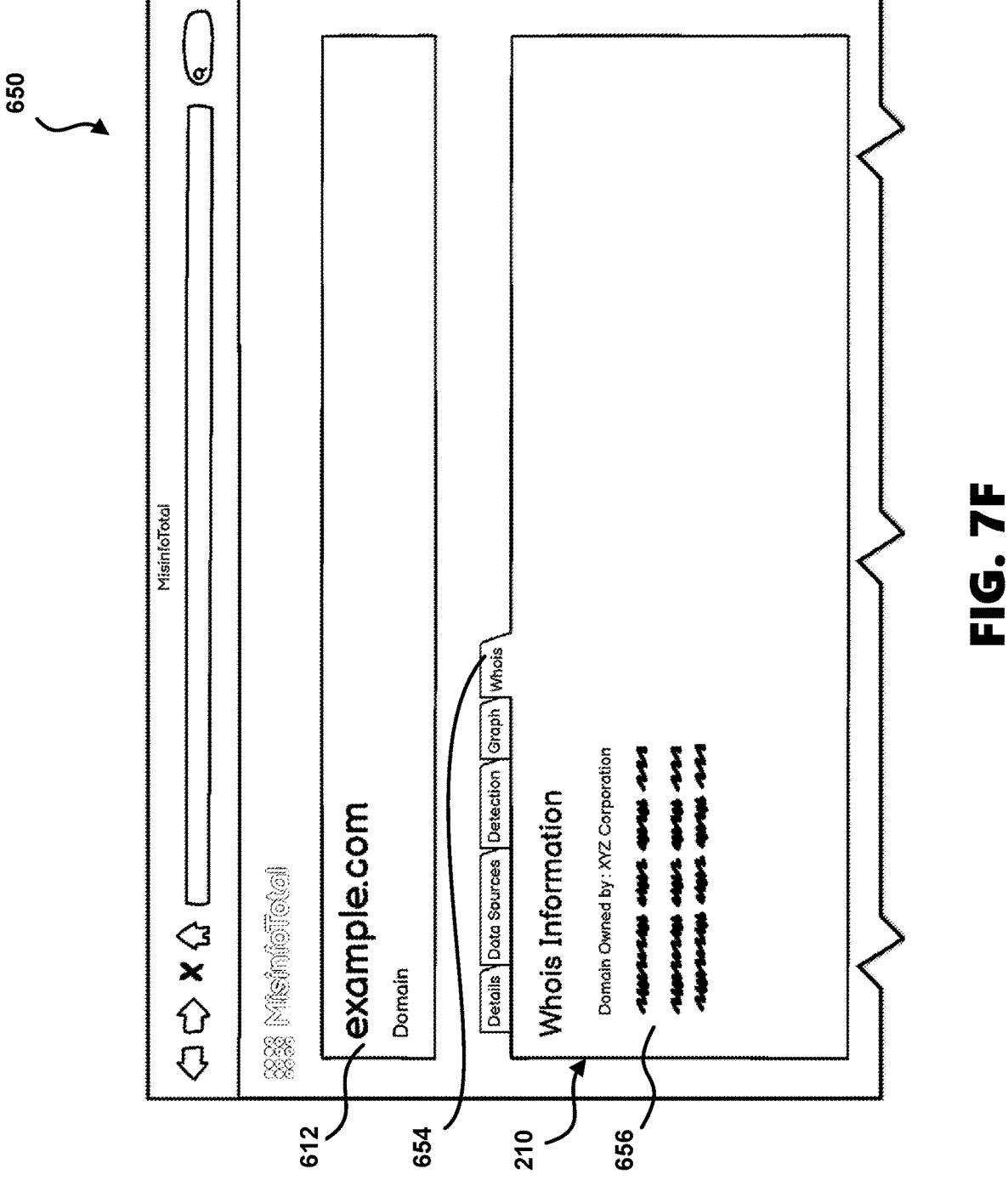

Referring to FIG. 5A, an alternative exemplary classifier in the form of a transformer-based model 500 is shown useful for determining a bias in a rating of a media instance. The model 500 includes inputs 502, 504, 506, 508, an embedding layer 510, bidirectional encoder representations from transformers ("BERT") 512, vector outputs 522, 524, 526, 528, an output classification process 530, and a bias determination output 532. A first input 502 includes ordered words (media word$_1$, media word$_2$ , . . . media word$_n$) extracted from a data media instance (e.g., an online article or post) accessed from a media source system 42 by the evaluation manager 20 via the media systems interface 30 or by the browser agent 60 via a browser 50. The ordered words of the first input 502 can include one or more phrases, one or more sentences, one or more sentence fragments, or one or more paragraphs. If the media instance includes audio or video data, the first input 502 can include a transcription or encoding of the audio or video data performed by the modeling engine 22. A second input 504 includes a separator token ("[SEP]") providing a separation between the first input 502 and a third input 506. The third input 506 includes a rating indication in the form of one or more ordered words (rating word$_1$, rating word$_2$ , . . . rating word$_n$), accessed from a fact checking system 40 by the evaluation manager 20 via the fact checking systems interface 34 or by the browser agent 60 via a browser 50, for example "true," "false," "partially true," "partially false," or a transcription or encoding of audio or video data. The rating indication and corresponding third input 506 can include one or more words, one or more phrases, one or more sentences, one or more sentence fragments, one or more paragraphs, or an entire article, for example describing the nature of truthfulness or falseness of the media instance. A fourth input 508 includes a classification token ("[CLS]") including a fixed embedding without information related to the media instance or the rating indication.

The model 500 can be run for example by the modeling engine 22 of the evaluation manager 20 based on media instances and rating indications received by the evaluation manager 20. The embedding layer 510 creates vector representations of the inputs 502, 504, 506, 508 which are passed to the BERT 512. The BERT 512 employs stacked transformer encoders to generate the vector outputs 522, 524, 526, 528. The BERT 512 generates first vector outputs 522 respectively associated with the ordered words of the media instance of the first input 502. The BERT 512 generates a second vector output 524 associated with the second input 504. The BERT 512 generates one or more third vector outputs 526 respectively associated with the one or more ordered words of the rating indication of the third input 506. The BERT 512 generates a fourth vector output

528 associated with the first input 502, the second input 504, and the third input 506. The fourth vector output 528 is fed to the output classification process 530, for example including a feed forward neural network and a softmax function. The output classification process 530 produces a bias determination output 532 based on the fourth vector output 528.

The bias determination output 532 includes an assessment of bias (i.e., accuracy) of the rating indication, which assessment is numeric across a range, for example a range between 1 and 5, where 1 is unbiased, 2 is slightly biased, 3 is moderately biased, 4 is highly biased, and 5 is very highly biased. In an embodiment, the assessment of bias includes probabilities of bias, for example a 10% probability the media is unbiased, 20% probability of slight bias, 40% probability of moderate bias, 20% probability of high bias, and 10% chance of very high bias, wherein the assessment of bias is reflected based on the highest probability. The assessment of bias can be attributed to the media instance or the fact checker (e.g., author) of the rating indication. Biases of multiple rating indications associated with a particular fact checker can be averaged to determine a bias of the particular fact checker.

Referring to FIG. 5B, a hypothetical exemplary implementation of the exemplary model 500 is shown in which a hypothetical sentence fragment "space aliens arrive" extracted from a hypothetical data media instance is input as a first input 502A. The sentence fragment "un-founded and distorted" extracted from a hypothetical rating indication corresponding to the hypothetical data media instance is input as a second input 506A. The BERT 512 generates first vector outputs 522A respectively associated with the ordered words of the hypothetical data media instance of the first input 502. The BERT 512 generates a second vector output 524A associated with the second input 504A. The BERT 512 generates third vector outputs 526A respectively associated with the ordered words of the rating indication of the third input 506A. The BERT 512 generates a fourth vector output 528A associated with the first input 502A, the second input 504A, and the third input 506A. The fourth vector output 528A is fed to the output classification process 530. A hypothetical bias determination output 532A is determined as "unbiased" by the output classification process 530 based on the fourth vector output 528A of the BERT 512.

The model 500 can be trained for example by automatically labeling rating indications from certain fact checking systems 40 as corresponding to a specified bias determination output 532 regardless of the corresponding media instances, for example automatically labeling rating indications from fact checking systems 40 or fact checkers known with high confidence to be trustworthy or untrustworthy. The model 500 can further be trained automatically for example based on the assumption that all media instances from particular media source systems 42 are accurate or all media instances from particular media source systems 42 are inaccurate. For example, a "true" rating indication for a media instance originating from a known purveyor of falsehoods (e.g., an authoritarian governmental entity) can be associated with a "highly biased" bias determination output 532 during a training process.

The evaluation manager 20 determines a bias of a fact checking system 40 based on one or more determined biases of one or more rating indications hosted on the fact checking system 40. In an illustrative embodiment, the one or more determined biases are attributed to one or more fact checkers (e.g., authors) that authored the one or more rating indications, to generate one or more biases of the one or more fact checkers, which one or more biases of the one or more fact checkers are used to determine a bias of the fact checking system 40 operating for example under a domain (e.g., a hypothetical "factcheck-xyz.com").

The evaluation manager 20 can implement a weighted ensemble to aggregate the rating indications (e.g., labels) from multiple fact checkers on a site or network-enabled application hosted by a fact checking system 40. A weight of a fact checker is derived from their historical rating activities (e.g., labeling activities), bias determinations, and consensus with other fact checkers. For example, if a fact checker always rates news from authoritarian governments positively and the fact checker's ratings do not match with other news sources, the evaluation manager 20 via the modeling engine 22 is more likely to label the fact checker as biased. Equation 1 determines a bias (e.g., bias label) for a domain or network-accessible application operated by a fact checking system 40 based on bias determination of a fact checker or an average of one or more rating indications authored by the fact checker.

$$B = \sum_{i=0}^{n} w_i * b_i, \qquad \text{Eq. 1}$$

where, B=a bias determination of a fact checking system 40;

$w_i$=a weight of an $i^{th}$ fact checker operating on the fact checking system 40, and $b_i$=a bias determination (e.g., label) of an $i^{th}$ fact checker or an average of one or more rating indications of the $i^{th}$ fact checker.

A correctness can be calculated based on the bias. For example, correctness can be calculated as an inverse of a bias. The bias and correctness of a fact checker and a fact checking system 40 can change over time. The evaluation manager 20 periodically recalculates the bias and correctness of fact checkers and fact checking systems 40 with newly labeled data. The bias determination $b_i$ is calculated as a numerical value across a predetermined range for example from 1 to 5.

Referring to FIG. 6, a hypothetical example browser window 80 is generated by the browser 50 on a user interface 54 of a computing device 12 based on a hypothetical interaction with a hypothetical website ("factcheck-xyz.com") enabled by a fact checking system 40. The browser window 80 presents a claim of one or more media instances (e.g., online articles or posts) and a rating authored by a fact checker ("Joseph Tillsom") regarding the claim of the one or more media instances. The rating is made up of conclusory text including the word "false" and explanatory phrases in support of the conclusory text including in part " . . . postings on various platforms suggested that . . . ". A hypothetical exemplary site evaluation window 82 is generated by the browser agent 60 on the user interface 54 based on an evaluation performed by the modeling engine 22 of the evaluation manager 20. The site evaluation window 82 includes a determination of bias (i.e., accuracy) of the rating ("unbiased"), a determination of bias of the fact checker ("unbiased"), and a determination of bias of the website ("slightly biased"). The determinations of the bias of the rating and the bias of the fact checker are made for example by application by the evaluation manager 20 (via the modeling engine 22) or the browser agent 60 of the first RNN 300, the second RNN 400 and process flow 420, or the transformer-based model 500 to the rating of the fact checker and the one or more media instances associated with the rating. The determination of the bias of the website is made for example by application of Equation 1 to a plurality of determinations of bias of a plurality of fact checkers, for example by application by the evaluation manager 20 or browser agent 60 of Equation 1 to the ratings of a plurality of fact checkers publishing on the hypothetical website.

Referring to FIGS. 1, 2, 7A, 7B, 7C, 7D, 7E, and 7F, hypothetical example browser windows 600, 610, 620, 630, 640, 650 are generated by a browser 50 on a user interface 54 of a computing device 12 based on a hypothetical interaction by the browser 50 with the browser API 32 of the evaluation manager 20. A first browser window 600 includes a search bar 602 allowing a user to enter a URL (e.g., "example.com").

In response to the user entering the URL in the search bar 602, the evaluation manager 20 via the modeling engine 22 generates a report 210 set forth in a plurality of tabs 614, 624, 634, 644, 654. In a second browser window 610 a URL display box 612 shows the entered URL (e.g., "example.com"). A details tab 614 of the report 210 includes a details display box 616 which sets forth a domain label (e.g., "fake domain" or "real domain"), number of trackers, number of third-party cookies, and a number of Twitter™ users sharing the domain of the URL entered in the search bar 602. A "fake domain" corresponds to a domain where a majority of published or shared media is determined to be false by the evaluation manager 20. A "real domain" corresponds to a domain where a majority of published or shared media is determined to be true by the evaluation manager 20.

A third browser window 620 includes the URL display box 612 showing the entered URL (e.g., "example.com") and the report 210. A data sources tab 624 of the report 210 includes a data sources display box 626 which sets forth the domain label including an assessment of the domain corresponding to the entered URL (e.g., "fake domain" or "real domain") and an indication of datasets on which the assessment of the domain was based, for example "Flagged as Fake by 2 open datasets" including "dataset1" and "dataset2" or "Flagged as real by 3 open datasets" including "dataset3" and "dataset4".

A fourth browser window 630 includes the URL display box 612 showing the entered URL (e.g., "example.com") and the report 210. A detection tab 634 of the report 210 includes a detection display box 636 which sets forth fact detection organizations corresponding to the datasets on which the assessment of the domain was based, labels including assessments published by the fact checking organizations (e.g., "fake domain" or "real domain"), dates when the labels were published by the fact checking organizations, and links to the fact checking organizations (e.g., "examplexyz.com" or "exampleabc.com").

A fifth browser window 640 includes the URL display box 612 showing the entered URL (e.g., "example.com") and the report 210. A graph tab 644 of the report 210 includes a graph display box 646 which shows domains linked to and from the entered URL and whether the domains have been labeled as "fake" or "real" by the evaluation manager 20. As indicated in the graph display box 646, hypothetical example domains "examplecba.com," "examplebcd.com," and "exampledef.com" include webpages or other resources linked to and linked from webpages or other resources under the domain corresponding to the entered URL ("example.com"), which three connected domains are each labeled as a "fake domain". A hypothetical example domain "examplecde.com" includes one or more webpages or one or more other resources linked from one or more webpages or one or more other resources under the domain corresponding to the entered URL ("example.com"). The examplecde.com domain is labeled as a "real domain".

A sixth browser window 650 includes the URL display box 612 showing the entered URL (e.g., "example.com") and the report 210. A Whois tab 654 of the report 210 includes a Whois display box 656 which shows Whois records accessed by the evaluation manager 20 for the domain corresponding to the entered URL.

Referring to FIG. 8, a method 700 in which a bias of an accuracy rating is determined and transmitted is shown. The method 700 is described with reference to the components of the environment 10, including the evaluation manager 20, the fact checking systems 40, media source systems 42, and the computing devices 12 including the browser 50 and the browser agent 60. Alternatively, the method 700 can be performed via other systems and is not restricted to being implemented by the components of the environment 10.

The method 700 includes detecting at a plurality of network locations a plurality of accuracy ratings of a plurality of media instances (step 702), for example detecting each of the plurality of accuracy ratings at one of the plurality of network locations. The method 700 further includes detecting the plurality of media instances (step 704). The plurality of media instances can be detected at multiple network locations, for example detecting each of the plurality of media instances at one of the multiple network locations.

A particular accuracy rating of one or more particular media instances is detected at a particular network location (step 706), and the one or more particular media instances are detected (step 708). The one or more particular media instances can be detected at one or more other network locations, for example each of the one or more particular media instances can be detected at one of the one or more other network locations. A bias of the particular accuracy rating is determined based on the particular accuracy rating, the one or more particular media instances, the plurality of accuracy ratings, and the plurality of media instances (step 710). In a particular implementation, a classifier is trained based on the plurality of accuracy ratings and the plurality of media instances, and the classifier is applied to the particular accuracy rating and the one or more particular media instances to determine the bias of the particular accuracy rating. An indication is transmitted to a user via a computing device based on the bias of the particular accuracy rating (step 712). In an extension of the method 700, a bias of the particular network location is determined based on the bias of the particular accuracy rating.

In a further extension of the method 700, one or more other accuracy ratings of one or more other media instances are detected at the particular network location, and the one or more other media instances are detected. A bias of the one or more other accuracy ratings is determined based on the one or more other accuracy ratings, the one or more other media instances, the plurality of accuracy ratings, and the plurality of media instances. The indication is transmitted to the user further based on the bias of the one or more other accuracy ratings. A bias of the particular network location is determined based on the bias of the particular accuracy rating and the bias of the one or more other accuracy ratings. In a particular implementation, the bias of the one or more other accuracy ratings is further based on the particular accuracy rating and the one or more particular media instances. A bias of the particular network location can be determined based on the bias of the particular accuracy rating and the bias of the one or more other accuracy ratings, and the indication can be transmitted to the user further based on the bias of the particular network location.

The particular accuracy rating and the one or more other accuracy ratings can be originated by an entity. A bias of the entity can be determined based on the bias of the particular accuracy rating and the bias of the one or more other accuracy ratings, and the indication can be transmitted to the user further based on the bias of the entity.

In a further extension of the method 700, multiple other accuracy ratings of multiple other media instances are detected at the particular network location. The multiple other media instances are detected. Biases of the multiple other accuracy ratings are determined based on the multiple other accuracy ratings, the multiple other media instances, the plurality of accuracy ratings, and the plurality of media instances. The indication is transmitted to the user further based on the bias of the multiple other accuracy ratings.

In a particular implementation, the particular accuracy rating is originated by a first entity, and the multiple other accuracy ratings are originated by a second entity. A bias of the first entity is determined based on the bias of the particular accuracy rating. A bias of the second entity is determined based on the biases of the multiple other accuracy ratings. A bias of the particular network location is determined based on the bias of the first entity and the bias of the second entity. The indication is transmitted to the user further based on the bias of the particular network location. In an extension, a weight of the bias of the first entity is determined based on one or both of a rating history of the first entity or a consensus by the first entity with other entities. The bias of the particular network location is determined further based on the weight of the bias of the first entity and the weight of the bias of the second entity. In a further extension, additional accuracy ratings of additional media instances are detected at the particular network location. The additional media instances are detected. Biases of the additional accuracy ratings are determined based on the additional accuracy ratings, the additional media instances, the plurality of accuracy ratings, and the plurality of media instances. The bias of the first entity is determined further based on the biases of the additional accuracy ratings.

In a further extension of the method 700, browsing at the particular network location by the user is detected on the computing device, and the indication is transmitted to the user via the computing device responsive to detecting the browsing at the particular network location. In a particular implementation, browsing at the particular network location by the user is detected on the computing device, bias of the particular accuracy rating is determined responsive to detecting the browsing at the particular network location, and the indication is transmitted to the user via the computing device responsive to detecting the browsing at the particular network location.

Referring to FIG. 9, a method 800 in which a bias of an accuracy rating is determined and transmitted is shown. The method 800 is described with reference to the components of the environment 10, including the evaluation manager 20, the fact checking systems 40, media source systems 42, and the computing devices 12 including the browser 50 and the browser agent 60. Alternatively, the method 800 can be performed via other systems and is not restricted to being implemented by the components of the environment 10.

The method 800 includes detecting at a plurality of network locations a plurality of accuracy ratings of a plurality of media instances (step 802), for example detecting each of the plurality of accuracy ratings at one of the plurality of network locations. The method 800 further includes detecting the plurality of media instances (step 804). The plurality of media instances can be detected at multiple network locations, for example each of the plurality of media instances can be detected at one of the multiple network locations. A classifier (e.g., BERT) is trained based on the plurality of accuracy ratings and the plurality of media instances (step 806). A particular accuracy rating of one or more particular media instances is detected at a particular network location (step 808). The one or more particular media instances are detected (step 810). The one or more particular media instances can be detected at one or more other network locations, for example each of the one or more particular media instances can be detected at one of the one or more other network locations. The classifier is applied to the particular accuracy rating and the one or more particular media instances to determine a bias of the particular accuracy rating (step 812). An indication is transmitted to a user via a computing device based on the bias of the particular accuracy rating (step 814).

In an extension of the method 800, a bias of the particular network location is determined based on the bias of the particular accuracy rating. In a further extension of the method 800, one or more other accuracy ratings of one or more other media instances are detected at the particular network location. The one or more other media instances are detected, for example at one or more additional network locations. The classifier is applied to the one or more other accuracy ratings and the one or more other media instances to determine a bias of the one or more other accuracy ratings. A bias of the particular network location is determined based on the bias of the particular accuracy rating and the bias of the one or more other accuracy ratings.

Figure 10:
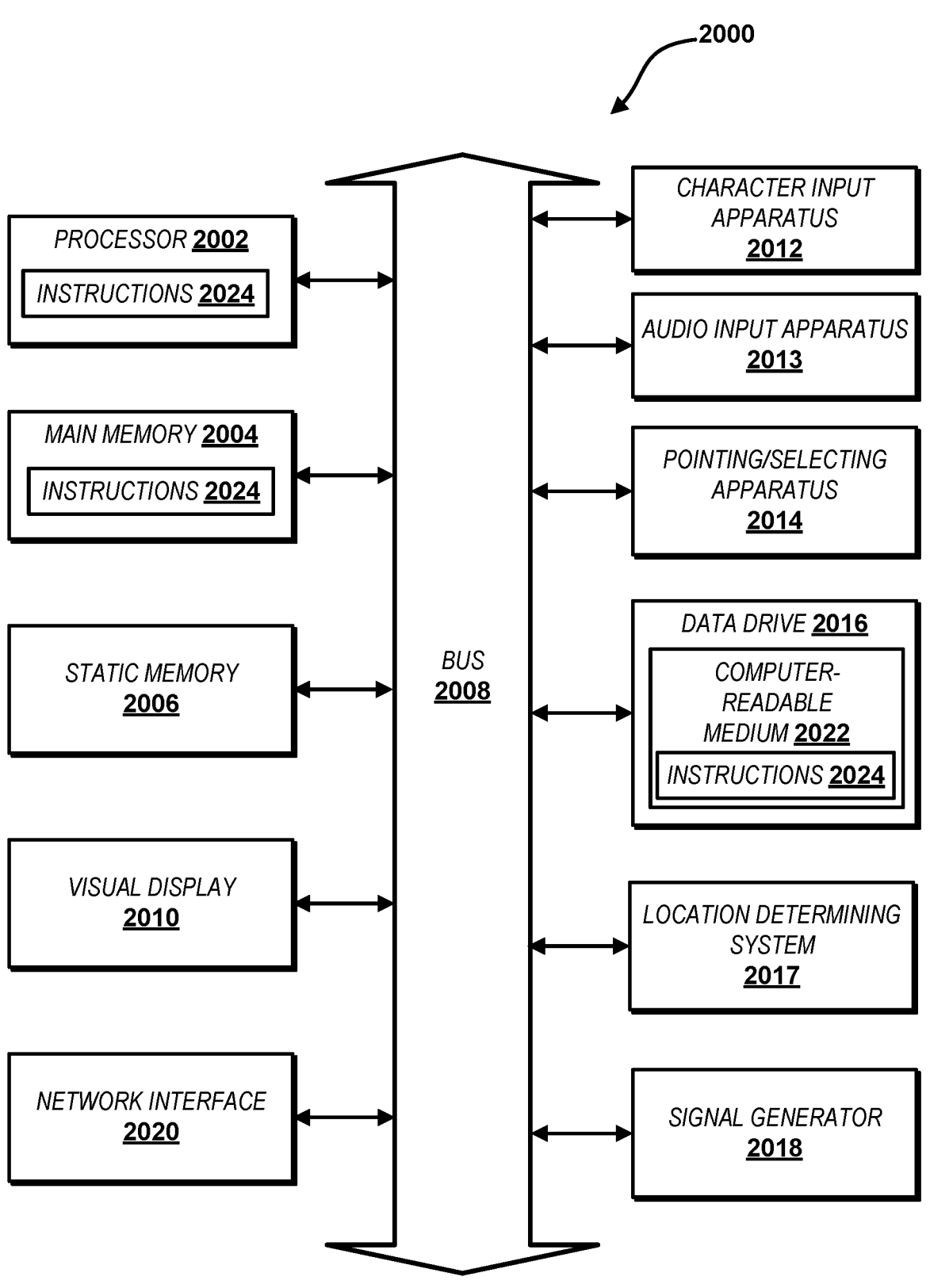
FIG. 10 shows a computer system for performing described methods according to illustrative embodiments.

FIG. 10 illustrates in abstract the function of an exemplary computer system 2000 on which the systems, methods and processes described herein can execute. For example, the computing device 12 and the evaluation manager 20 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), a light emitting diode (LED) display, or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:

detecting at a first plurality of network locations a plurality of accuracy ratings of a plurality of media instances;

detecting at a second plurality of network locations the plurality of media instances, each of the plurality of accuracy ratings associated with at least one of the plurality of media instances;

training a classifier in a form of a machine learning model based on the plurality of accuracy ratings and the plurality of media instances, the classifier comprising bidirectional encoder representations from transformers ("BERT") and an embedding layer, the training of the classifier comprising for each of the plurality of accuracy ratings:

inputting to the BERT via the embedding layer one or more words of the accuracy rating, a plurality of words of the at least one of the plurality of media instances associated with the accuracy rating, and a separator separating the one or more words of the accuracy rating from the plurality of words of the at least one of the plurality of media instances associated with the accuracy rating; and providing as an output to the BERT a predetermined bias;

detecting on a computing device browsing at a particular network location by a user, the computing device comprising a user interface comprising a display;

detecting at the particular network location based on the browsing at the particular network location a particular accuracy rating of at least one particular media instance in a window in the display;

detecting the at least one particular media instance at least one other network location;

applying the classifier to the particular accuracy rating and the at least one particular media instance to determine a bias of the particular accuracy rating, the applying the classifier comprising inputting to the BERT via the embedding layer one or more words of the particular accuracy rating, a plurality of words of the at least one particular media instance, and the separator separating the one or more words of the particular accuracy rating from the plurality of words of the at least one particular media instance to determine the bias of the particular accuracy rating responsive to the browsing at the particular network location; and displaying an indication to the user in the window concurrently with the particular accuracy rating based on the bias of the particular accuracy rating responsive to the browsing at the particular network location.

2. The method of claim 1, further comprising determining a bias of the particular network location based on the bias of the particular accuracy rating.

3. The method of claim 1, further comprising:

detecting at the particular network location at least one other accuracy rating of at least one other media instance;

detecting the at least one other media instance;

determining a bias of the at least one other accuracy rating based on the at least one other accuracy rating, the at least one other media instance, the plurality of accuracy ratings, and the plurality of media instances; and displaying the indication to the user further based on the bias of the at least one other accuracy rating.

4. The method of claim 3, further comprising:

determining a bias of the particular network location based on the bias of the particular accuracy rating and the bias of the at least one other accuracy rating.

5. The method of claim 3, further comprising:

determining the bias of the at least one other accuracy rating further based on the particular accuracy rating and the at least one particular media instance;

determining a bias of the particular network location based on the bias of the particular accuracy rating and the bias of the at least one other accuracy rating; and displaying the indication to the user further based on the bias of the particular network location.

6. The method of claim 3, wherein the particular accuracy rating and the at least one other accuracy rating are originated by an entity;

determining a bias of the entity based on the bias of the particular accuracy rating and the bias of the at least one other accuracy rating; and transmitting the indication to the user further based on the bias of the entity.

7. The method of claim 1, further comprising:

detecting at the particular network location multiple other accuracy ratings of multiple other media instances;

detecting the multiple other media instances;

determining biases of the multiple other accuracy ratings based on the multiple other accuracy ratings, the multiple other media instances, the plurality of accuracy ratings, and the plurality of media instances; and displaying the indication to the user further based on the biases of the multiple other accuracy ratings.

8. The method of claim 7, wherein the particular accuracy rating is originated by a first entity, and the multiple other accuracy ratings are originated by a second entity;

determining a bias of the first entity based on the bias of the particular accuracy rating;

determining a bias of the second entity based on the biases of the multiple other accuracy ratings;

determining a bias of the particular network location based on the bias of the first entity and the bias of the second entity; and displaying the indication to the user further based on the bias of the particular network location.

9. The method of claim 8, further comprising:

determining a weight of the bias of the first entity based on at least one of a rating history of the first entity or a consensus by the first entity with other entities; and determining the bias of the particular network location further based on the weight of the bias of the first entity and a weight of the bias of the second entity.

10. The method of claim 8, further comprising:

detecting at the particular network location additional accuracy ratings of additional media instances;

detecting the additional media instances;

determining biases of the additional accuracy ratings based on the additional accuracy ratings, the additional media instances, the plurality of accuracy ratings, and the plurality of media instances; and determining the bias of the first entity further based on the biases of the additional accuracy ratings.

11. A computing system comprising at least one processor and at least one non-transitory computer readable storage medium having encoded thereon instructions that when executed by the at least one processor cause the computing system to perform a process including:

detecting at a first plurality of network locations a plurality of accuracy ratings of a plurality of media instances;

detecting at a second plurality of network locations the plurality of media instances, each of the plurality of accuracy ratings associated with at least one of the plurality of media instances;

training a classifier in a form of a machine learning model based on the plurality of accuracy ratings and the plurality of media instances, the classifier comprising bidirectional encoder representations from transformers ("BERT") and an embedding layer, the training of the classifier comprising for each of the plurality of accuracy ratings:

inputting to the BERT via the embedding layer one or more words of the accuracy rating, a plurality of words of the at least one of the plurality of media instances associated with the accuracy rating, and a separator separating the one or more words of the accuracy rating from the plurality of words of the at least one of the plurality of media instances associated with the accuracy rating; and providing as an output to the BERT a predetermined bias;

detecting browsing at a particular network location by a user;

detecting at the particular network location based on the browsing at the particular network location a particular accuracy rating of at least one particular media instance in a window in a display;

detecting the at least one particular media instance at least one other network location;

applying the classifier to the particular accuracy rating and the at least one particular media instance to determine a bias of the particular accuracy rating, the applying the classifier comprising inputting to the BERT via the embedding layer one or more words of the particular accuracy rating, a plurality of words of the at least one particular media instance, and the separator separating the one or more words of the particular accuracy rating from the plurality of words of the at least one particular media instance to determine the bias of the particular accuracy rating responsive to the browsing at the particular network location; and displaying an indication to the user in the window concurrently with the particular accuracy rating based on the bias of the particular accuracy rating responsive to the browsing at the particular network location.

12. A network-enabled evaluation system comprising:

a first computing system comprising at least a first processor and at least a first non-transitory computer readable storage medium having encoded thereon first instructions that when executed by the at least the first processor cause the first computing system to perform a first process including:

detecting at a first plurality of network locations a plurality of accuracy ratings of a plurality of media instances;

detecting at a second plurality of network locations the plurality of media instances, each of the plurality of accuracy ratings associated with at least one of the plurality of media instances;

training a classifier in a form of a machine learning model based on the plurality of accuracy ratings and the plurality of media instances, the classifier comprising bidirectional encoder representations from transformers ("BERT") and an embedding layer, the training of the classifier comprising for each of the plurality of accuracy ratings:

inputting to the BERT via the embedding layer one or more words of the accuracy rating, a plurality of words of the at least one of the plurality of media instances associated with the accuracy rating, and a separator separating the one or more words of the accuracy rating from the plurality of words of the at least one of the plurality of media instances associated with the accuracy rating; and providing as an output to the BERT a predetermined bias;

detecting at a particular network location a particular accuracy rating of at least one particular media instance;

detecting the at least one particular media instance at least one other network location; and applying the classifier to the particular accuracy rating and the at least one particular media instance to determine a bias of the particular accuracy rating, the applying the classifier comprising inputting to the BERT via the embedding layer one or more words of the particular accuracy rating, a plurality of words of the at least one particular media instance, and the separator separating the one or more words of the particular accuracy rating from the plurality of words of the at least one particular media instance to determine the bias of the particular accuracy rating at the particular network location; and a second computing system comprising a user interface comprising a display, at least a second processor, and at least a second non-transitory computer readable storage medium having encoded thereon second instructions that when executed by the at least the second processor cause the second computing system to perform a second process including: detecting browsing at the particular network location by a user;

detecting at the particular network location based on the browsing at the particular network location the particular accuracy rating of the at least one particular media instance in a window in the display;

receiving the bias of the particular accuracy rating from the first computing system responsive to the browsing at the particular network location; and displaying an indication to the user in the window concurrently with the particular accuracy rating based on the bias of the particular accuracy rating responsive to the browsing at the particular network location.

13. A non-transitory computer-readable storage medium storing executable instructions that, as a result of execution by one or more processors of a computing system, cause the computing system to perform operations comprising:

detecting at a first plurality of network locations a plurality of accuracy ratings of a plurality of media instances;

detecting at a second plurality of network locations the plurality of media instances, each of the plurality of accuracy ratings associated with at least one of the plurality of media instances;

training a classifier in a form of a machine learning model based on the plurality of accuracy ratings and the plurality of media instances, the classifier comprising bidirectional encoder representations from transformers ("BERT") and an embedding layer, the training of the classifier comprising for each of the plurality of accuracy ratings:

inputting to the BERT via the embedding layer one or more words of the accuracy rating, a plurality of words of the at least one of the plurality of media instances associated with the accuracy rating, and a separator separating the one or more words of the accuracy rating from the plurality of words of the at least one of the plurality of media instances associated with the accuracy rating; and providing as an output to the BERT a predetermined bias;

detecting on a computing device browsing at a particular network location by a user, the computing device comprising a user interface comprising a display;

detecting at the particular network location based on the browsing at the particular network location a particular accuracy rating of at least one particular media instance in a window in the display;

detecting the at least one particular media instance at least one other network location;

applying the classifier to the particular accuracy rating and the at least one particular media instance to determine a bias of the particular accuracy rating, the applying the classifier comprising inputting to the BERT via the embedding layer one or more words of the particular accuracy rating, a plurality of words of the at least one particular media instance, and the separator separating the one or more words of the particular accuracy rating from the plurality of words of the at least one particular media instance to determine the bias of the particular accuracy rating responsive to the browsing at the particular network location; and displaying an indication to the user in the window concurrently with the particular accuracy rating based on the bias of the particular accuracy rating responsive to the browsing at the particular network location.

14. The method of claim 1, further comprising detecting at the first plurality of network locations the plurality of accuracy ratings of the plurality of media instances by the computing device.

15. The method of claim 1, the training of the classifier further comprising for each of the plurality of accuracy ratings determining the predetermined bias based on at least one of a fact checking system operating at one of the first plurality of network locations or a media source system operating at one of the second plurality of network locations.

* * * * *